US007581180B2

(12) United States Patent
Masui et al.

(10) Patent No.: US 7,581,180 B2
(45) Date of Patent: Aug. 25, 2009

(54) PORTABLE TERMINAL, METHOD FOR INPUTTING THE INFORMATION, METHOD AND APPARATUS FOR DICTIONARY RETRIEVAL AND MEDIUM

(75) Inventors: Toshiyuki Masui, Tokyo (JP); Tetsuya Kohno, Kanagawa (JP); Osamu Sakurai, Tokyo (JP)

(73) Assignee: Sony Corporation, Tokyo (JP)

( * ) Notice: Subject to any disclaimer, the term of this patent is extended or adjusted under 35 U.S.C. 154(b) by 828 days.

(21) Appl. No.: 09/853,302

(22) Filed: May 10, 2001

(65) Prior Publication Data
US 2002/0019731 A1 Feb. 14, 2002

(30) Foreign Application Priority Data
May 12, 2000 (JP) .............................. 2000-140951

(51) Int. Cl.
*G06F 17/21* (2006.01)
*G06F 17/28* (2006.01)

(52) U.S. Cl. ...................... 715/259; 715/255; 715/260; 715/264; 715/265

(58) Field of Classification Search .................. 715/530, 715/532, 536, 526, 255, 259, 260, 264, 265, 715/273; 707/3–4, 6
See application file for complete search history.

(56) References Cited

U.S. PATENT DOCUMENTS 5,199,104 A * 3/1993 Hirayama .................... 715/776
5,442,780 A * 8/1995 Takanashi et al. .............. 707/1
5,615,378 A * 3/1997 Nishino et al. ................. 704/4
5,774,537 A * 6/1998 Kim .......................... 379/157
5,959,629 A * 9/1999 Masui ........................ 715/808

(Continued)

FOREIGN PATENT DOCUMENTS

JP 04151786 A * 5/1992

(Continued)

OTHER PUBLICATIONS

Baeza-Yates et al., "A New Approach to Text Searching", Communications of the ACM, Oct. 1992, pp. 74-82, vol. 35 No. 10.

(Continued)

*Primary Examiner*—Laurie Ries
*Assistant Examiner*—Chau Nguyen
(74) *Attorney, Agent, or Firm*—Finnegan, Henderson, Farabow, Garrett & Dunner, L.L.P.

(57) ABSTRACT

A portable terminal in which the labor in inputting plural characters and a variety of information can be relieved in case limitations are imposed on the number of available keys. The portable terminal includes an LCD 26, a memory 17 for storing the dictionary information comprised of plural words and exemplary sentences, a key input unit 29 for inputting unit characters, a CPU 13 for retrieving from the memory the words and/or exemplary sentences displayed on the LCD 26 based on the input from the key input unit 29 and/or on the character string already finalized, and a jog dial 40. A desired word and/or exemplary sentence is selected from the plural words and/or exemplary sentences retrieved by the CPU 13 responsive to rotation of the jog dial 40 and displayed on the LCD 26 and the information on the finalized character string is generated.

30 Claims, 29 Drawing Sheets

U.S. PATENT DOCUMENTS

| | | | | |
|---|---|---|---|---|
| 6,026,400 | A | * | 2/2000 | Suzuki .......................... 707/6 |
| 6,112,174 | A | * | 8/2000 | Wakisaka et al. ........... 704/251 |
| 6,351,657 | B2 | * | 2/2002 | Yamada ...................... 345/157 |
| 6,600,919 | B1 | * | 7/2003 | Kawase ................... 455/414.1 |
| 6,616,703 | B1 | * | 9/2003 | Nakagawa .................. 715/530 |
| 6,985,562 | B1 | * | 1/2006 | Matsuda et al. .......... 379/88.06 |
| 2001/0003826 | A1 | * | 6/2001 | Iwata ......................... 709/206 |
| 2001/0046885 | A1 | * | 11/2001 | Yamada ...................... 455/566 |
| 2003/0212674 | A1 | * | 11/2003 | Nakagawa ..................... 707/3 |

FOREIGN PATENT DOCUMENTS

| | | | | | |
|---|---|---|---|---|---|
| JP | 405002399 | A | * | 1/1993 | ................ 704/205 |
| JP | 05233600 | A | * | 9/1993 | |
| JP | 10187701 | A | * | 7/1998 | |
| JP | 11312168 | A | * | 11/1999 | |

OTHER PUBLICATIONS

Sun-Wu et al., "Agrep—A Fast Approximate Pattern-Matching Tool", Proceedings of the Winter 1992 USENIX Conference, Jan. 1992, pp. 153-162, USENIX Association, Berkeley CA.

Yamada et al., "Character String Retrieval LSI Enabling Ambiguity Retrieval", Nikkei Electronics, Jun. 1987, pp. 165-181, No. 422.

Masui et al., "'Smooth' User Interface", Information Processing Association Journal, Jan. 1996, pp. 3-23.

* cited by examiner

```
SURU/SURU
SHISUTEMU/SHISUTEMU
SOUSA/SOUSA
MASUI/MASUI
YÛSA/YÛZA
...
```

FIG.21

```
IRU/YATTE/IRU
INAI/YATTE/INAI
MASU/KAKE/MASU
KAKE/GA/KAKE
KA/BUNSHOU/GA
...
```

FIG.22

PORTABLE TERMINAL, METHOD FOR INPUTTING THE INFORMATION, METHOD AND APPARATUS FOR DICTIONARY RETRIEVAL AND MEDIUM

BACKGROUND OF THE INVENTION

1. Field of the Invention

This invention relates to a portable terminal capable of inputting at least the text, an information inputting method, a dictionary retrieving method and apparatus, a medium which allows an information processing apparatus to carry out the information inputting method and the dictionary retrieving method, and to a medium for providing the portable terminal and the dictionary retrieving apparatus with the dictionary information.

2. Description of Related Art

Recently, portable terminals have made remarkable progress and, as typical of these portable terminals, a portable telephone set, a PHS (portable handyphone system) terminal or portable E-mail forming devices, are being marketed in large quantities. In particular, the portable terminals and the PHS terminals have come to possess not only the function of making a call in speech as usual but also the function of transmitting/receiving E-mails as well as the function as a terminal for receiving a variety of services. So these terminals are expected to have more diversified functions as a mainstream of portable terminals.

Meanwhile, the portable terminals, such as portable telephone sets or PHS terminals, are required to be small-sized and lightweight. Therefore, it is difficult to add new buttons to these portable terminals. For this reason, the conventional practice has been to allocate plural functions to ten keys of from 0 key to 9 key and to a small number of other keys and to use combinations of these keys to effect character inputting at the time of preparation of E-mails, to select various services furnished or to input the information corresponding to these services. For example, not only the figures from 0 to 9 but also Japanese hiragana characters of "あ (uttered as "a⇆)-row, the first hiragana row", "か (uttered as "ka")-row, the second hiragana row", "さ (uttered as "sa")-row, the third hiragana row" and so forth and alphabetical letters such as ABC, DEF, GHI and so forth are allocated to the ten keys, such that messages of E-mails can be created by selecting these letters or characters. As a specified example, if characters "あ、い、う、え、お (uttered as "a, i, u, e and o")" of the "あ (uttered as "a")-row, the first hiragana row" are sequentially allocated to a key [1], characters "か、き、く、け、こ (uttered as "ka, ki, ku, ke and ko")" of the "か (uttered as "ka")-row, the second hiragana row" are sequentially allocated to a key [2], characters "さ、し、す、せ、そ (uttered as "sa, shi, su, se and so")" of the "さ (uttered as "sa")-row, the third hiragana row" are sequentially allocated to a key [3], characters "た、ち、つ、て、と (uttered as "ta, chi, tsu, te and to")" of the "た (uttered as "ta")-row, the fourth hiragana row" are sequentially allocated to a key [4], characters "な、に、ぬ、ね、の (uttered as "na, ni, nu, ne and no")" of the "な (uttered as "na")-row, the fifth hiragana row" are sequentially allocated to a key [5], characters "は、ひ、ふ、へ、ほ (uttered as "ha, hi, hu, he and ho")" of the "は (uttered as "ha")-row, the sixth hiragana row" are sequentially allocated to a key [6], characters "ま、み、む、め、も (uttered as "ma, mi, mu, me and mo")" of the "ま (uttered as "ma")-row, the seventh hiragana row" are sequentially allocated to a key [7], characters "や、ゆ、よ (uttered as "ya, yu, and yo")" of the "や (uttered as "ya")-row, the eighth hiragana row" are sequentially allocated to a key [8], characters "ら、り、る、れ、ろ (uttered as "ra, ri, ru, re and ro")" of the "ら (uttered as "ra")-row, the nineth hiragana row" are sequentially allocated to a key [9] and characters "わ、を、ん (uttered as "wa, wo, and nn")" of the "わ (uttered as "wa")-row, the tenth hiragana row" are allocated to a key [0 ], and characters こんにちは (hello; uttered as "kon-nichiwa")", for example, is to be input, the key [2], to which the "か (uttered as "ka")-row, the second hiragana row" is allocated, is thrust e.g., five times to select and finalize the character "こ (uttered as "ko")", the key [0], to which "わ、を、ん (uttered as "wa, wo, and nn")" are allocated, is thrust e.g., thrice to select and finalize the character "ん (uttered as "nn")", the key [5], to which the "な (uttered as "na")-row, the fifth hiragana row" is allocated, is thrust e.g. twice to select and finalize the character "に (uttered as "ni")" and so forth, this sequence of operations being carried out repeatedly. When it is desired to convert hiragana characters into kanji characters, kana-kanji conversion (conversion from Japanese kana characters into Chinese kanji characters) is additionally required.

The inputting with e.g., ten keys is extremely troublesome and is not suited for a case wherein the number of input characters is large or wherein Chinese kanji characters are to be input. For this reason, a technique which allows for easier inputting is desired. The above is not limited to portable terminals or to PHS terminals but applies to all sorts of portable terminals suffering from limitations as to the number of keys.

SUMMARY OF THE INVENTION

It is therefore an object of the present invention to provide a portable terminal, an information inputting method, a dictionary retrieving method and apparatus, and a medium, in which it is possible to relieve the labor of inputting plural characters or a variety of information in case limitations are imposed on the number of keys that can be installed.

If In one aspect, the present invention provides a portable terminal including display means for displaying at least a character, dictionary storage means for storing the dictionary information including at least a plurality of words and a plurality of exemplary sentences, inputting means for inputting at least a unit character, retrieval means for retrieving a plurality of words and/or exemplary sentences displayed on the display means, from the dictionary storage means, based on a character string input from the inputting means and/or already finalized, selecting means for selecting desired words and/or exemplary sentences from the plural words and/or exemplary sentences retrieved by the retrieval means and demonstrated on the display means, string generating means for generating the information on the finalized character string from the words and/or exemplary sentences selected by the selection means, and transmission/reception means for transmitting/receiving at least the information on the character string.

In another aspect, the present invention provides a portable terminal including display means for displaying at least a character, dictionary storage means for storing the dictionary information including at least a plurality of words and a plurality of exemplary sentences, inputting means for inputting at least a unit character, retrieval means for retrieving a plurality of words and/or exemplary sentences displayed on the display means, from the dictionary storage means, based on a character string input from the inputting means and/or already finalized, selecting means for selecting desired words and/or exemplary sentences from the plural words and/or exemplary sentences retrieved by the retrieval means and demonstrated on the display means, kana-kanji conversion means for converting a kana character string input from the inputting means into a character string including kanji characters, character string generating means for generating the information on a finalized character string from the word and/or exemplary sentence selected by the selection means and a character string converted by the kana-kanji conversion means, and transmission/reception means capable of transmitting/receiving at least the information on the character string.

In still another aspect, the present invention provides a information inputting method for a portable terminal including a display step of displaying at least a character on a display screen, an inputting step for at least inputting a unit character, a retrieving step for retrieving a plurality of words and/or exemplary sentences for display on the display picture from a dictionary storing the dictionary information made up of at least a plurality of words and a plurality of exemplary sentences based on a character string input in the inputting step and/or already finalized, a selecting step for selecting a desired word and/or exemplary sentence from the plural words and/or plural exemplary sentences retrieved by the retrieval operation and demonstrated on the display picture responsive to a rotational operation and a character string generating step of generating the information on the finalized character string from the words and/or exemplary sentences selected by the selecting step.

In still another aspect, the present invention provides a information inputting method for a portable terminal including a display step of displaying at least a character on a display screen, an inputting step for at least inputting a unit character, a retrieving step for retrieving a plurality of words and/or exemplary sentences for display on the display screen from a dictionary storing the dictionary information made up of at least a plurality of words and a plurality of exemplary sentences, based on a character string input in the inputting step and/or already finalized, a selecting step for selecting a desired word and/or exemplary sentence from the plural words and/or plural exemplary sentences retrieved by the retrieval operation and demonstrated on the display screen, a kana-kanji conversion step of converting a kana character string input in the inputting step into a character string including kanji characters, and a character string generating step of generating the information on a finalized character string from the words and/or exemplary sentences selected in the selecting step and/or the character string converted in the kana-kanji conversion step.

In still another aspect, the present invention provides a dictionary retrieval apparatus including dictionary storage means for storing a plurality of dictionary information each being made up of a plurality of words and a plurality of sentences, retrieval condition inputting means for inputting a retrieving condition in dictionary retrieval, and retrieving means for retrieving a desired word and/or exemplary sentence from the dictionary storage means based on the retrieving condition input from the retrieval condition inputting means. The retrieving means uses the plural different dictionary information stored in the dictionary storage means in retrieval in a switching fashion depending on particular situations.

In still another aspect, the present invention provides a dictionary retrieval method including a dictionary storage step for storing a plurality of dictionary information each being made up of a plurality of words and a plurality of sentences, a retrieval condition inputting step for inputting a retrieving condition in dictionary retrieval and a retrieving step for retrieving a desired word and/or exemplary sentence from the dictionary storage step based on the retrieving condition input from the retrieval condition inputting step. The retrieving step uses the plural different dictionary information stored in the dictionary storage step in retrieval in a switching fashion depending on particular situations.

In still another aspect, the present invention provides a medium for causing an information processing apparatus to execute a program including a step of displaying at least a character on a display screen, a step of inputting at least a unit character, a step of retrieving a plurality of words and/or exemplary sentences for display on the display screen from a dictionary storing the dictionary information made up of at least a plurality of words and/or exemplary sentences based on the character string input and/or already finalized, a step of selecting a desired word and/or exemplary sentence from a plurality of words and/or exemplary sentences retrieved and demonstrated on the display screen, responsive to a rotational operation, and a step of generating the information of the finalized character string from the selected word and/or sentence.

In still another aspect, the present invention provides a medium for causing an information processing apparatus to execute a program including a step of displaying at least a character on a display screen, a step of inputting at least a unit character, a step of retrieving a plurality of words and/or exemplary sentences for display on the display screen from a dictionary storing the dictionary information made up of at least a plurality of words and/or exemplary sentences based on the character string input and/or already finalized, a step of selecting a desired word and/or sentence from the plural words and/or exemplary sentences retrieved and demonstrated on the display screen, a step of converting the input kana character string into a character string including kanji characters and a step of generating the information of a finalized character string from the selected word and/or phrase and the kana-kanji converted character string.

In still another aspect, the present invention provides a medium for causing an information processing apparatus to execute a program including a step of inputting a retrieving condition for dictionary retrieval for a dictionary including a plurality of the dictionary information made up of at least a plurality of words and a plurality of exemplary sentences and a step of retrieving a desired word and/or sentence from the dictionary. The plural different dictionary information stored in the dictionary in retrieval are used in retrieval in a switching fashion depending on particular situations.

In still another aspect, the present invention provides a medium for furnishing the dictionary information made up of the plural words and/or exemplary sentences, to a portable terminal, in which the portable terminal includes display means for displaying at least a character, dictionary storage means for storing the dictionary information including at least a plurality of words and a plurality of exemplary sentences, inputting means for inputting at least a unit character, retrieval means for retrieving a plurality of words and/or exemplary sentences displayed on the display means, from the dictionary storage means, based on a character string input from the inputting means and/or already finalized, selecting means for selecting desired words and/or exemplary sentences from the plural words and/or exemplary sentences retrieved by the retrieval means and demonstrated on the display means, character string generating means for generating the information on the finalized character string from the words and/or exemplary sentences selected by the selection means, and transmission/reception means for transmitting/receiving at least the information on the character string.

In still another aspect, the present invention provides a medium for furnishing the dictionary information made up of a plurality of words and/or exemplary sentences to a portable terminal, in which the portable terminal includes display means for displaying at least a character, dictionary storage means for storing the dictionary information including at least a plurality of words and a plurality of exemplary sentences, inputting means for inputting at least a unit character, retrieval means for retrieving a plurality of words and/or exemplary sentences displayed on the display means, from the dictionary storage means, based on a character string input from the inputting means and/or already finalized, selection means for selecting a desired word and/or sentence from the plural words and/or exemplary sentences retrieved by the retrieving means and demonstrated on the display means, kana-kanji conversion means for converting a kana character string input from the inputting means into a character string including kanji characters, character string generating means for generating the information of a finalized character string from the word and/or sentence selected by the selection means and/or the character string converted by the kana-kanji conversion means, and transmission/reception means for transmitting/receiving at least the information on the character string.

In yet another aspect, the present invention provides a medium for furnishing the dictionary information made up of the plural words and/or exemplary sentences to a dictionary retrieving apparatus, in which the dictionary retrieving apparatus includes dictionary storage means for storing a plurality of the dictionary information each made up at least of plural words and/or exemplary sentences, retrieving condition inputting means for inputting a retrieving condition in dictionary retrieval, and retrieving means for retrieving a desired word and/or sentence from the dictionary storage means based on the retrieving condition input from the retrieving condition inputting means. The retrieving means in retrieval uses the plural different dictionary information stored in the dictionary storage means in a switching fashion depending on particular situations.

In the portable terminal, the information inputting method therefor, dictionary retrieving method and apparatus, and the medium, according to the present invention, in which plural words and/or exemplary sentences are retrieved form a dictionary, based on a unit character input and/or already finalized, a desired word and/or exemplary sentence is selected from the retrieved plural words and/or exemplary sentences and the information on a finalized character string is generated from the so-selected word and/or exemplary sentence, the labor of inputting plural characters or the a variety of information can be relieved even if limitations are imposed on the number of available keys.

BRIEF DESCRIPTION OF THE DRAWINGS

FIG. 21 illustrates the forms of a word dictionary used in an embodiment of the present invention.

FIG. 22 illustrates the from of a dictionary of exemplary sentences used in an embodiment of the present invention

DESCRIPTION OF THE PREFERRED EMBODIMENTS

Figure 1:
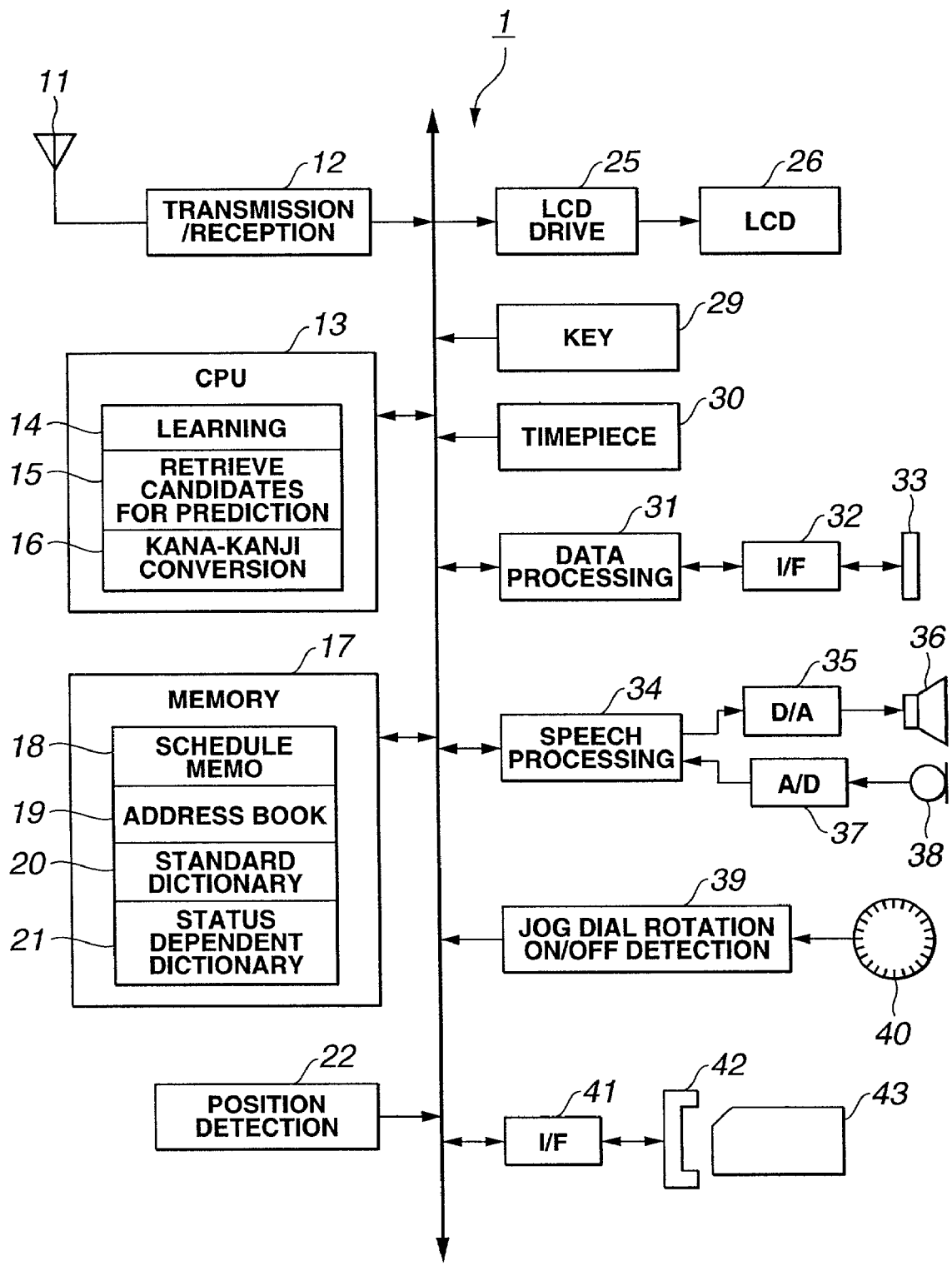
FIG. 1 is a block circuit diagram of a portable telephone set embodying the present invention.

Referring to the drawings, preferred embodiments of according to the present invention will be explained in detail.

The inner structure of a portable telephone set or a PHS terminal, as an embodiment of the present invention, is shown in FIG. 1. In the present embodiment, the portable telephone set and the PHS terminal are referred to as a portable telephone set 1 without making distinctions therebetween. Meanwhile, the structure shown in FIG. 1 is mainly pertinent to the present invention and other constitutional elements provided routinely in portable telephone sets are omitted for simplicity.

In FIG. 1, the transmission/reception unit 12 transmits/receives call data or other packet data over an antenna 11.

The call data received from the antenna 11 by a transmission/reception unit character 12 is sent to a speech processor 34 where it is processed with e.g., decoding or with error correction. The call data, so processed, is converted by a digital/analog (D/A) converter 37 into digital audio data, which then is processed in the speech processor 34 with e.g., encoding and error correction, and thence routed to the transmission/reception unit character 12 for transmission over antenna 11.

The packet data, other than the call data received from the antenna 11 by the transmission/reception unit character 12, is sent to a data processor 31 where it is unpacketed and output via an interfacing unit character 32 to an external equipment connected to an external connector 33. On the other hand, data input from the external equipment connected to the external connector 33 is packetized by the data processor 31 and thence supplied to the transmission/reception unit character 12 for transmission over antenna 11. The data received by the antenna 11 or the data input from the external connector 33 may also be stored in a pre-set storage area in a memory 17.

A key input unit character 29 includes a variety of keys, inclusive of ten keys of from [0] key to [9] key, as provided on a routine portable telephone set. If any of these keys is acted on by a user, a key input signal is generated responsive to the actuation. Meanwhile, not only the number keys of from [0] to [9], characters of the "あ (uttered as "a")-row, the first hiragana row", か (uttered as "ka")-row, the second hiragana row", "さ (uttered as "sa")-row, the third hiragana row" and so forth or letters [ABC], [DEF], [GHI] and so forth are allocated tot the ten-keys, as in the routine portable telephone set.

An LCD (liquid crystal display panel) driver 25 drives the LCD 26, based on a display signal generated responsive to a key input signal by a CPU (central processing; unit character) 13. This demonstrates numerical figures or characters on the LCD 26.

A timepiece unit character 30 generates date and time. On receipt of the date and time information, the CPU 13 generates date and time indication signal, based on the date and time information, to send the so-generated signal to the LCD drive 25.

In a memory 17, there are stored, in addition to a variety of information required for a routine portable telephone set, a method for inputting the information pertaining to the present invention, an application program for implementing a dictionary retrieving method data of a dictionary used for prediction candidate retrieval or kana-kanji conversion, inclusive of standard dictionaries or situation-dependent dictionaries, as later explained . Schedule memo data or address book data inclusive of telephone directory. The CPU 13 executes a variety of processing operations, as later explained, in accordance with the software stored in the memory 17. Meanwhile, the memory 17 is preferably a rewritable memory not in need of storage holding operations, and is also used as a work area for the CPU 13.

A position detection unit 22 detects the current position of the portable telephone set 1. Meanwhile, as means for position detection by the position detection unit 22, position detection by a so-called global positioning system (GPS) receiver or position detection based on the PHS base station position, for example, may be used. The position information as detected by this position detection unit 22 is sent to the CPU 13 for use in changing a dictionary as later explained.

A jog dial rotation on/off detection unit 39 detects rotation of pressing of a jog dial 40 to send a signal indicating the status change to the CPU 13. The jog dial 40 and the jog dial rotation on/off detection unit 39 will be explained later in detail.

A stick- or card-shaped memory medium 43 can be inserted into a slot 42. Data read out from the memory medium 43 is sent over an interfacing unit 41 to the CPU 13 or to the memory 17, while data sent from the CPU 13 or the memory 17 can be written over the interfacing unit 41 on the memory medium 43. The memory medium 43 will be explained later in detail.

The CPU 13 has a learning functional unit 14, a prediction candidate retrieving function unit 15 and a kana-kanji converting function unit 16, having the function of controlling the entire inner constitutional elements of the portable telephone set 1 and of executing the processing of learning, prediction candidate retrieval and kana-kanji conversion processing, as later explained. The detailed processing operations of the CPU 13 according to the present invention will be explained subsequently in detail. Although an embodiment in which the learning functional unit 14, prediction candidate retrieving function unit 15 and the kana-kanji converting function unit 16 execute the functions of the CPU 13, is explained as the present embodiment, these units 14 to 16 may also be provided on a chip other than the CPU 13.

Figure 2:
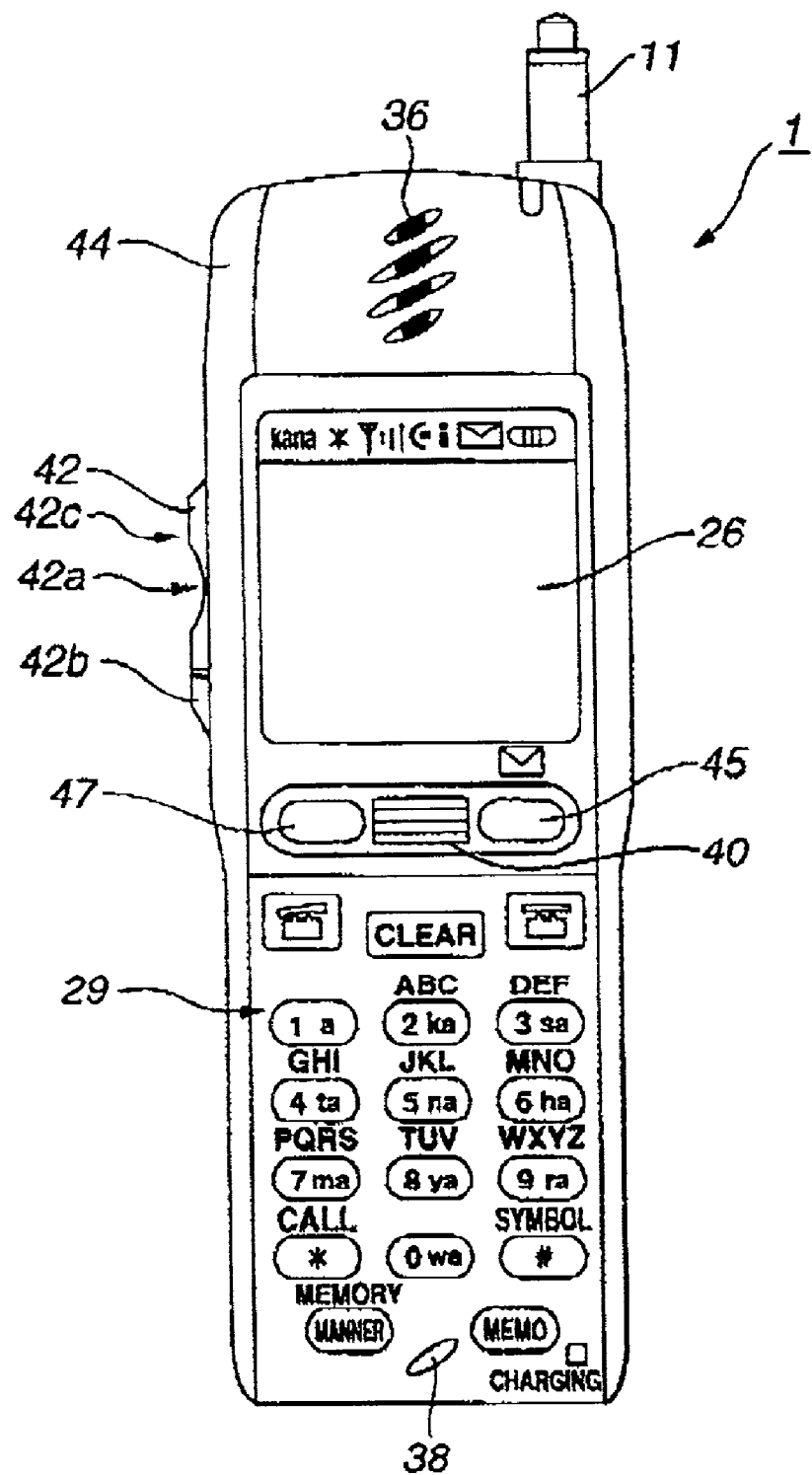
FIG. 2 is a front view of a portable telephone set embodying the present invention.

FIG. 2 shows an outer appearance of a portable telephone set 1 embodying the present invention.

Referring to FIG. 2, the portable telephone set 1 of the present embodiment includes circuitry shown in FIG. 1. The aforementioned loudspeaker 36 is arranged in a front portion of the casing 44 to which the ear of the user is normally applied, whilst the aforementioned microphone 38 is arranged in another front portion of the casing which is close to the mouth of the user during call. The aforementioned LCD 26 is arranged between the loudspeaker 36 and the microphone 38 above the mid portion of the casing and respective keys of the key input unit character 29 are arrayed below the casing mid portion.

At a mid portion on the front side of the casing 44 of the portable telephone set 1 of the embodiment of FIG. 2 is arranged the aforementioned jog dial 40. Although the jog dial 40 may be arranged at a location other than this portion, it is preferably arranged at a position which permits more facilitated operation by e.g., a user's thumb finger.

Figure 3:
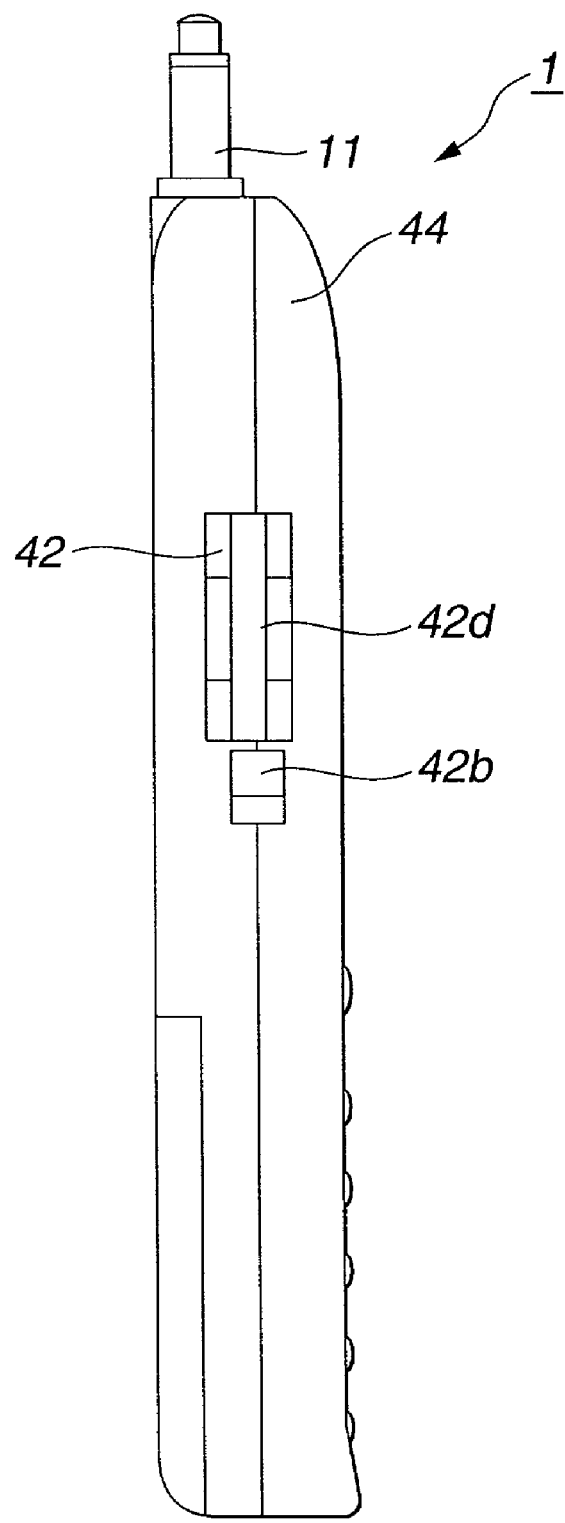
FIG. 3 is a left-hand side view of the portable telephone set shown in FIG. 2.

Referring to FIGS. 2 and 3, the aforementioned socket 42, in which to insert and connect the memory medium 43, is provided at a pre-set location on e.g., the left lateral surface of the casing 44. This socket 42 is provided with an insertion/ejection opening 42d for the memory medium 43, a protuberance 42c for protecting the memory medium 43 against external shock when the memory medium 43 is inserted in position, an ejection button 42b for taking out the memory medium 43 inserted, and a cut-out 42a for facilitating the ejection of the memory medium 43 with the finger end when the memory medium 43 is electrically disconnected as a result of thrusting the ejection button 42b. Although the mounting position of the socket 42 illustrated is merely illustrative, it is desirably arranged at such a position which is not obstructive to the carrying of the portable telephone set 1 and which permits facilitated insertion/ejection of the memory medium 43.

On the casing 44 of the portable telephone set 1 of the present embodiment, there are also provided an antenna 11, an LED (light-emitting diode) emitting light on reception or charging, a battery housing section, a mail sending button 45 or a letter finalizing key 47 included in the key input unit 29. However, these are similar to those routinely provided on a portable telephone set, and hence are not explained specifically.

Figure 4:
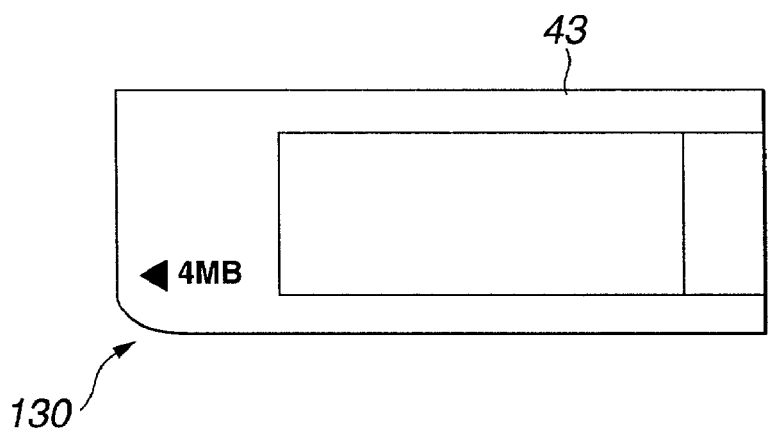
FIG. 4 is a front view of a memory medium.
Figure 5:
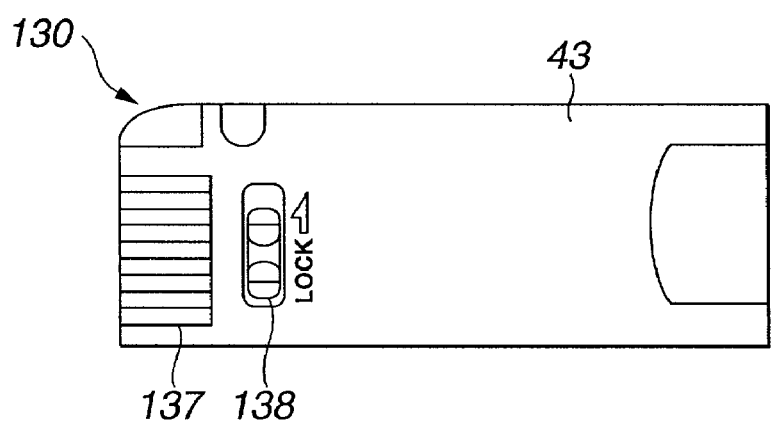
FIG. 5 is a back side view of the memory medium shown in FIG. 4.
Figure 6:
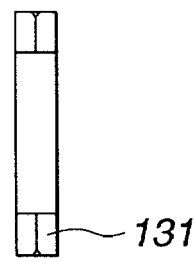
FIG. 6 is a right-hand side view of the memory medium shown in FIG. 4.

FIGS. 4 and 5 show the appearance of a stick-shaped memory medium in the form of a stock-shaped chewing gum, as typical of the memory medium 43. FIGS. 4, 5 and 6 show the front side, back side and the right-hand side lateral surface of the memory medium 43, respectively.

Referring to FIGS. 4 and 5, the memory medium 43 is provided with the cut-out 130. The memory medium 43 is inserted from the direction of the cut-out 130 into the insertion/ejection opening 42d of the slot 42 of the portable telephone set 1.

The memory medium 43 is provided with a terminal unit 137, connected to a connection terminal provided in the slot 42 of the portable telephone set 1, and a write inhibiting lock 138 for inhibiting data writing.

Figure 7:
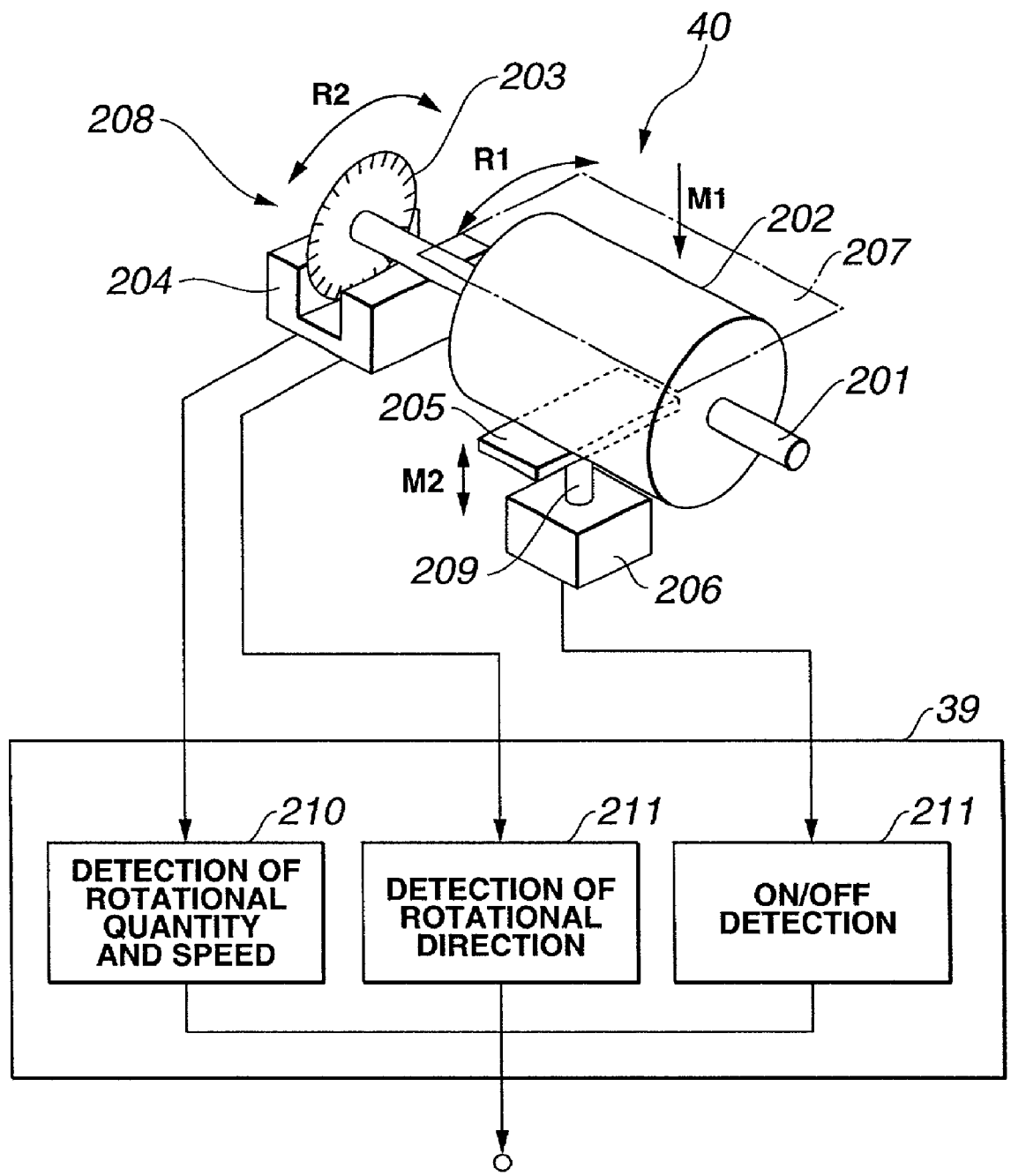
FIG. 7 shows a detailed structure of a jog dial and a detection unit for jog dial rotation and on/off.

FIG. 7 shows a detailed structure of the jog dial 40 and the jog dial rotation on/off detection unit 39.

An upper portion of a roll 202 of the jog dial 40 lying above a plane indicated by a chain-dotted line 207 is arranged for being protruded from the surface of the casing 44 of the portable telephone set 1. The roll 202 is mounted on an elastic shaft 201 for being rotated by e.g., a finger of the user. This elastic shaft 201 is formed by an elastic member and, if the roll 202 is manually thrust downwards in the direction indicated by arrow M1, the elastic shaft 201 is flexed downwards under the so-applied pressure. If the thrusting pressure is released, the elastic shaft 201 is reset to its original state, that is flexed upwards. On e.g., a foremost part of the elastic shaft 201 is mounted a disc 203 of a rotary encoder 208.

The rotary encoder 208 is fitted with a detector 204 comprised of an LED and a photodetector arranged for sandwiching a slit formed on the circumference of the disc 203. Thus, on rotation of the disc 203, such a state in which the light radiated from the LED traverses the slit part to fall on the photodetector and such a state in which the light is interrupted and hence is not incident on the photodetector occur alternately. The rotary encoder 208 sends a light reception signal, generated on photoelectric conversion of light transmitted through the slit responsive to rotation of the disc 208, to a rotational quantity and rotational speed detector 210 and a rotational detection detector 212 of the jog dial rotation on/off detection unit 39.

By the light reception signal, supplied from the detector 104, the rotational quantity and rotational speed detector 210 of the jog dial rotation on/off detection unit 39 measures how many slits have passed on the optical path between the LED and the photodetector with rotation of the disc 203 in the direction indicated by a center arrow R2 in FIG. 7 and how many slits have passed per unit time on the optical path between the LED and the photodetector per unit time to detect the rotational quantity and speed of the disc 203, that is the rotational quantity and speed of the roll 202 in the direction indicated by arrow R1 in FIG. 7. A detection signal of the rotational quantity and speed is sent to the CPU 13.

On the other hand, the rotational detection detector 212 of the jog dial rotation on/off detection unit 39 detects the direction of rotation of the disc 203, and hence that of the roll 202, by a signal supplied from the detector 104. For detecting the direction of rotation, the LED and the photodetector of the detector 204 are arranged with a phase difference of 90 and from which of the sine and cosine waves the light reception signal has been input is detected by the rotational detection detector 211. This rotational direction decision signal is routes to the CPU 13.

A contact plate 205 is arranged in contact with the lower portion of the roll 202 of the jog dial 40 and mounted on a switch unit 206 via a slider shaft 109. The switch unit 206 is turned on and off by vertical movement of the slider shaft 109 as shown by arrow M2, specifically, it is turned on and off when the slider shaft 109 is moved down and up, respectively. The switch unit 206 includes a spring mechanism for restoring the slider shaft 109 upwards when the force of thrusting the slider shaft 109 downwards is removed. Thus, in the jog dial 40, the slider shaft 109 is thrust downwards as indicated by arrow M2 when roll 202 is thrust downwards in the direction indicated by arrow M1, with the switch unit 206 being then turned on. Conversely, when the force of thrusting the roll 202 downwards in the direction indicated by arrow M, the slider shaft 109 is thrust upwards in the direction indicated by arrow M1 and hence the slider shaft 109 is uplifted in the direction indicated by arrow M2 to turn the switch unit 206 off. The on/off signal of the switch unit 206 is sent to an on/off detector 212 of the jog dial rotation on/off detection unit 39.

The on/off detector 212 of the jog dial rotation on/off detection unit 39 detects, by an on/off signal from the switch unit 206, whether or not the roll 202 of the jog dial 40 has been thrust manually. The on/off detection signal of the jog dial 40 is sent to the CPU 13.

Thus, the CPU 13 receives respective detection signals from the jog dial rotation on/off detection unit 39 and is thereby apprized of the operating state of the jog dial 40 by the user of the portable telephone set 1.

The above-described portable telephone set 1 of the present embodiment includes, in addition tot the function of usual call, the function of preparing and transmitting/receiving a so-called E-mail. In particular, when preparing the E-mail text, the information inputting method and the dictionary retrieving method according to the present invention are employed. In the following, the basic concept in case of application of the information inputting method and the dictionary retrieving method according to the present invention in the portable telephone set 1 of the present invention is explained.

In preparing a text, such as E-mail text, a lot of operations are needed in inputting respective letters making up a sentence. That is, as discussed in connection with the prior art, the letters making up a text desired to be prepared are sequentially selected and finalized, letter by letter, by acting on ten keys, while an extremely cumbersome operation of kana-kanji conversion is also required.

If plural candidates of letters, words or paragraphs, collectively referred to below as words, are given, with the partial information pertinent to a letter string desired to be input, for example, the leading letter, or several letters, which may not be consecutive, in the letter string desired to be input, as a retrieving condition, the words that are required are selected from these candidates and the words so selected are joined together, the sentence desired to be input can be prepared without the necessity of sequentially selecting and finalizing the totality of letters making up the text desired to be prepared and further performing the operation of the kana-kanji conversion.

So, in the portable telephone set 1 of the present embodiment, at least the following six guidelines, different from the conventional sentence formulating operations by the portable telephone set are adopted to realize the high-speed letter input.

The first guideline is to give the retrieving condition by a simplified operation.

The second guideline is to predict and dynamically change the set of words listed as candidates, in keeping with changes in the retrieving condition, then retrieve and display the candidates, as an object of selection. This retrieval is referred to below as prediction candidate retrieval.

The third guideline is to select and finalize target words from among the plural candidates displayed as the retrieved results. This operation is referred to below as prediction candidate retrieval conversion.

The fourth guideline is to predict or calculate the likelihood of occurrence of words, in carrying out the prediction candidate retrieval, from the general occurrence frequency or context of the letter strings or words, already finalized, directly ahead of an inputting point of a word, and to display the candidates in the sequence of the decreasing probability of selection as a word, as the result of the prediction.

The fifth guideline is adaptively link the above-described prediction candidate retrieval conversion to the kana-kanji conversion, such as conjunctive paragraph conversion or simple conversion, to relieve the load in the text inputting operation, in such a manner as to evade giving an extraneous feeling to a user accustomed to the kana-kanji conversion.

The sixth guideline is to arbitrarily or dynamically change the dictionaries of candidate words used at the time of prediction candidate retrieval, depending on the using time, using site, user, context or the application of the portable telephone set.

For realization of the above-mentioned six guidelines, the following techniques are used by way of an example.

In specifying the retrieving condition, described above, the ten key of the key input unit 29, for example, are used to specify a portion of the reading of the letter string of the text desired to be input. That is, only the one leading letter, only a few consecutive letters, beginning from the leading end, or letters corresponding to only a few letters, selected in a skipping fashion, beginning from the leading end, are selectively input by the ten keys, instead of inputting the entire reading of the word desired to be input, to specify the retrieving condition in retrieving a word desired to be input.

In the above-described retrieval, display and selection of the candidate words, a set of the candidate words beginning from the reading is presented, as an object for selection, at an instant the portion of the reading of the input letter string is specified, that is, when the retrieving condition (the above reading) for retrieving the word desired to be input is specified, plural words matched to the retrieving condition (reading) are displayed as candidates. In retrieving the candidate words, input words are predicted from the already finalized letter string, lying directly ahead of the word inputting point, with the use of exemplary texts, provided at the outset, and the input words, so predicted, are preferentially displayed. For example, if the already finalized letter string, lying directly ahead, ends with "よろしく(nice to meet you; uttered as "yoroshiku")" and if the reading "お(uttered as "o")" is entered by a ten-key, a word "お願い(please; uttered as "onegai")" is used preferentially as a candidate. If, in retrieving the candidate word, there is no exemplary text matched to the retrieving condition (reading), the words matched to the reading, among the words having a higher use frequency or words selected recently, are presented preferentially as candidate words. If there is not present a word matched to the retrieving condition, the ambiguity retrieval, as later explained, is executed to present the word close to the retrieving condition as a candidate. The plural words, obtained as described above, serve as objects for selection from which to select the words desired to be input. Meanwhile, the set of the candidate words is displayed at a pre-set location, such as at a lower portion, in a display screen of the LCD 26.

Based on the above-described six guidelines and specified techniques, the manner in which the text of an E-mail, for example, is input with the portable telephone set of FIG. 1, is explained with reference to FIGS. 8 to 18.

A specified example of inputting the Japanese text running "こんにちは今日は天気がとても良く秋らしく気持ちよい日です。山へ紅葉を見に行きましょう。(Hello. Today's weather is very fine and autumn-like. Let's go to the mountain to see tinged autumnal red leaves; uttered as "konnichiwa kyouwa totemo tenkigayoku akirashiku kimochiyoi hidesu. Yamae kouyouwo mini ikimashou")" is explained with reference to FIGS. 8 to 18, in which the portable telephone set 1 of FIG. 2, having the inner structure shown in FIG. 1, is shown from the front side of the portable telephone set 1. In these figures, only the reference numerals for illustration are shown, while the other reference numerals are omitted for simplicity.

Figure 8:
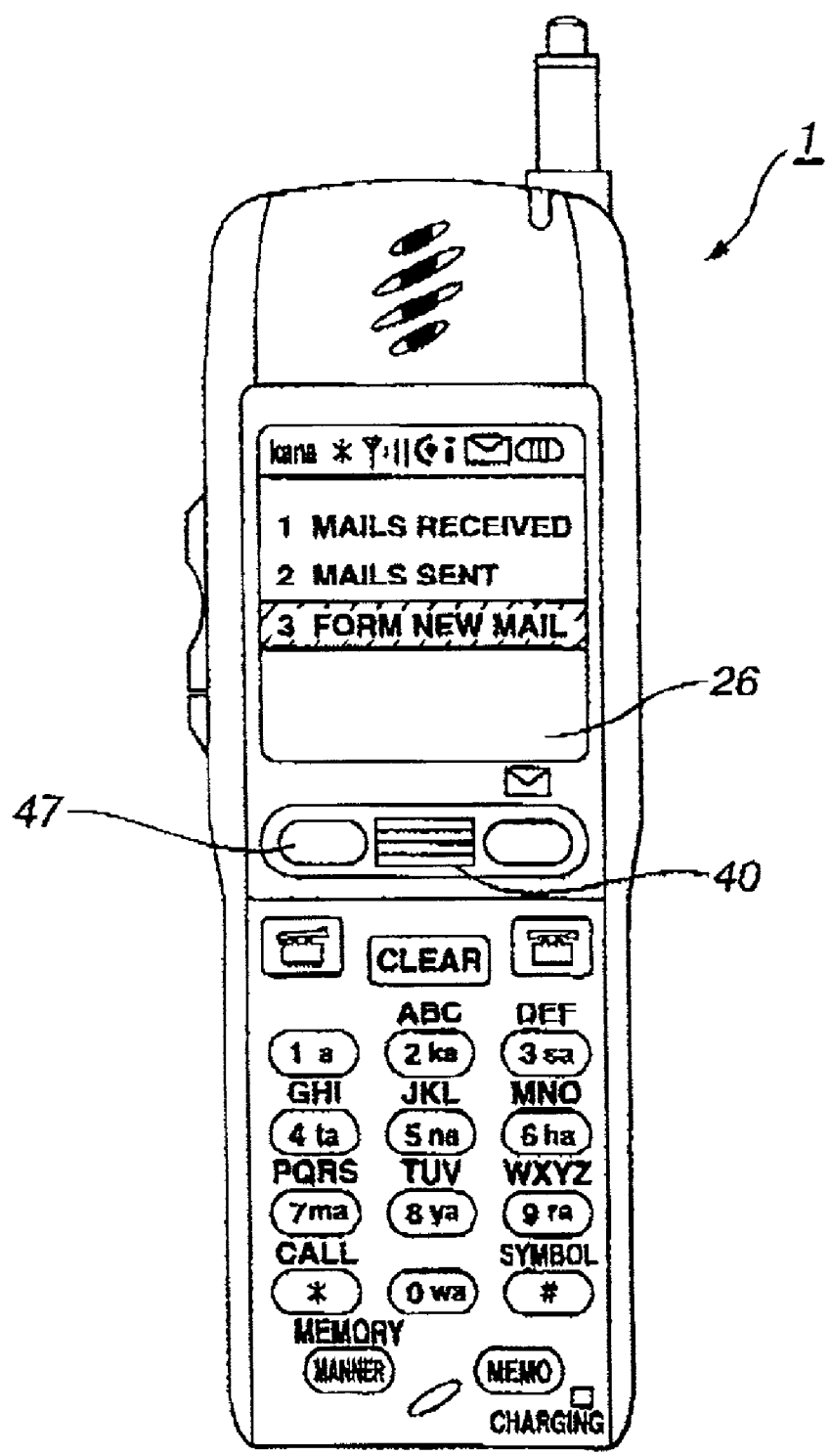
FIG. 8 illustrates an initial menu screen in case of performing an operation pertinent to E-mail in the portable telephone set embodying the present invention.

In the portable telephone set 1 of the present embodiment, in performing operations pertinent to an E-mail, an initial menu picture pertinent to the E-mail, shown in FIG. 8, is displayed. In the case of the portable telephone set 1 of the present embodiment, menu items [1 mail receipt memo], [2 mails sent] and [3 forming a new mail] are displayed in the initial menu picture pertinent to the E-mail. In the respective menu items, the highlighted items indicate that the items are candidates for selection as desired menu items. If, in this state, a pre-set key, for example, is pressed, the selection of the menu item highlighted is finalized. If, as the selection of a given item is not finalized, the jog dial 40 is rotated e.g., upwards (towards the LCD) or downwards (towards the ten-key), highlighted display of the respective menu items is shifted to an upper or lower menu item. This enables a desired one of the displayed menu items to becomes a candidate for selection. In the embodiment of FIG. 8, the user desires to create the text of the E-mail newly, the jog dial 40 is pressed down, as the menu item [3 forming new mail] is highlighted, to finalize the selection of the menu item [3 forming new mail].

Figure 9:
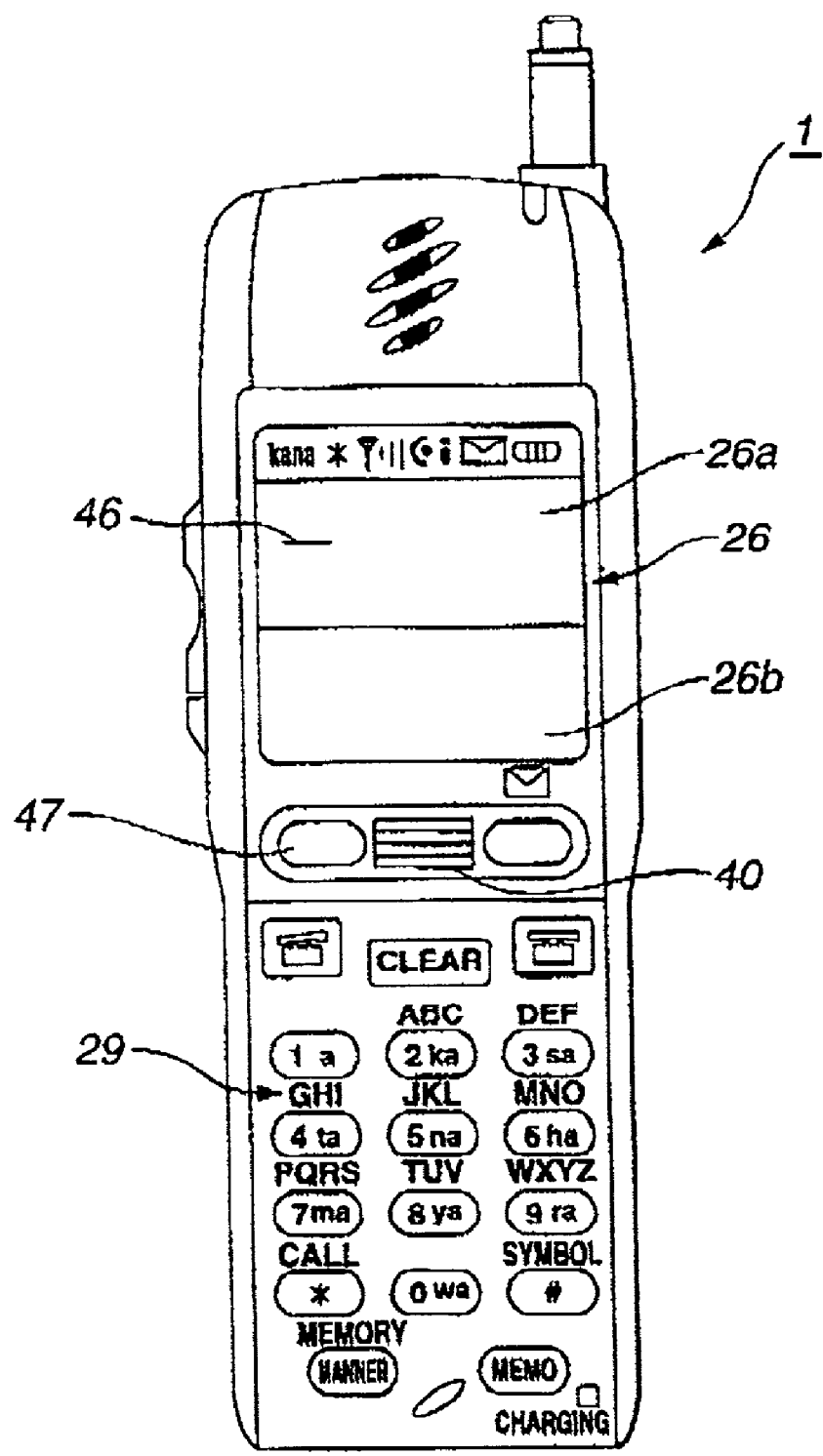
FIG. 9 illustrates a screen of a queuing state in a portable telephone set embodying the present invention.

If the selection of menu item [3 forming new mail] is finalized, the display picture on the LCD 26 is in a letter inputting queuing state, as shown in FIG. 9. The picture of the letter inputting queuing state, in the embodiment of FIG. 9, is divided into upper and lower half portions, with the upper half portion being an input display area 26*a* and a lower half portion 26*b*. A cursor 46 indicating a letter or word inputting site is displayed in the upper half input display area 26*a*. Although the initial cursor position is at a left upper corner of the input display area 26*a* in keeping with the Japanese text written horizontally, this is merely illustrative such that the initial cursor position may be at an upper right corner in case of the text written vertically.

Figure 10:
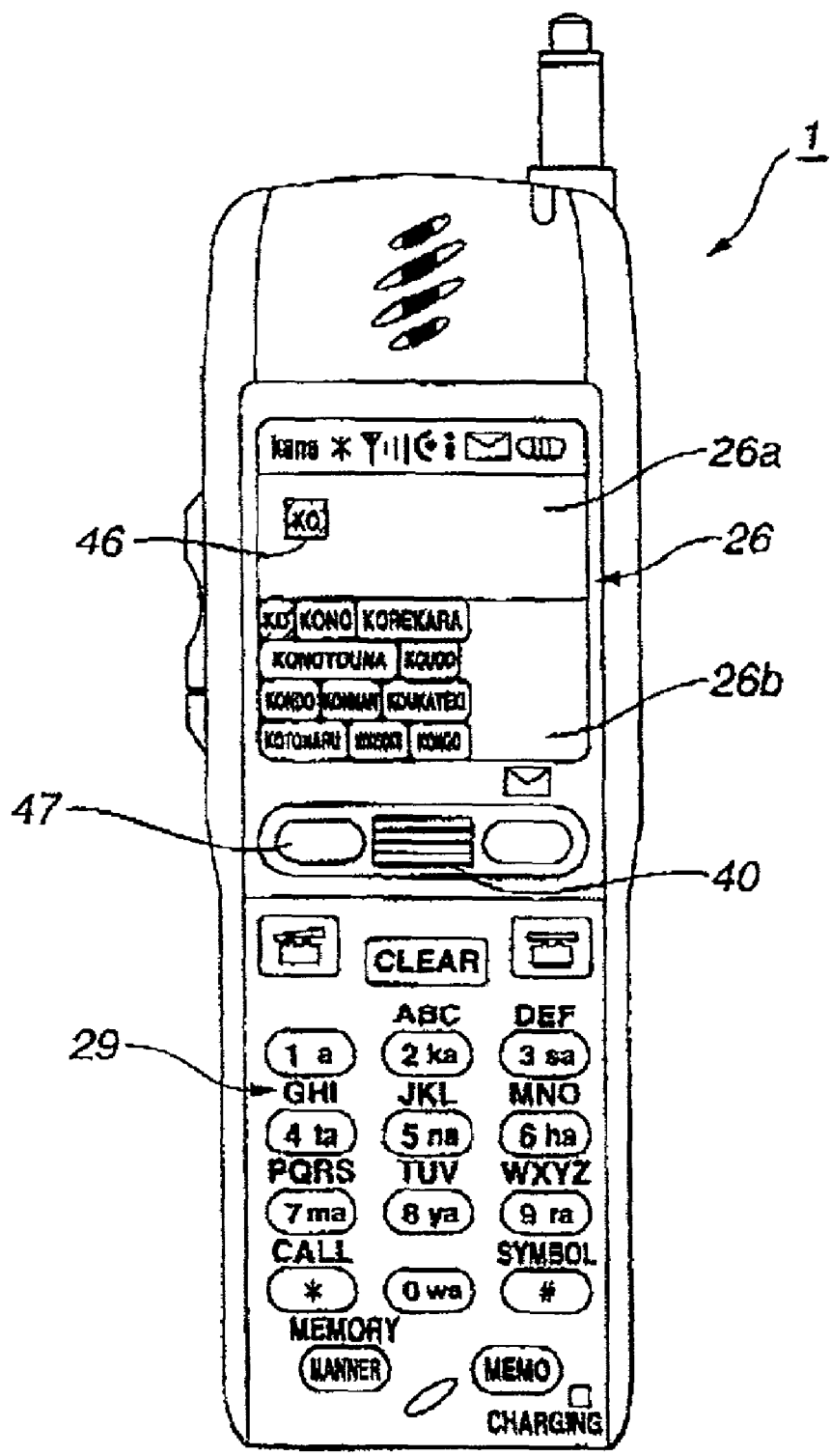
FIG. 10 illustrates an example in which a condition for retrieving "こ (uttered as "ko")" is input to an input displaying area and in which candidate words in meeting with the retrieving condition for retrieving "こ (uttered as "ko")" are displayed in a candidate display area.

If, a letter queuing state picture is displayed, a desired ten key is pushed to enter a letter, the input letter corresponding to the ten key is displayed on the cursor 46 in the letter display area 26*a*. FIG. 10 shows an illustrative picture displaying a letter "こ (uttered as "ko")" as result of the five times pressing of the key [2] to which is associated the "か (uttered as "ka")-row, the second hiragana row".

If the letter "こ (uttered as "ko")" is input, a set of plural candidate words beginning with "こ (uttered as "ko")" is displayed, with the letter "こ (uttered as "ko")" as the retrieving condition. In FIG. 10, "こ(uttered as "ko")", "この (this; uttered as "kono")", "これから (from now; uttered as "korekara")", "このような (like this; uttered as "konoyouna")", "高度 (altitude; uttered as "koudo")", "今度 (next time; uttered as "kondo")", "困難 (difficult; uttered as "konnan")", "効果的 (effective; uttered as "koukateki")", "異なる (different; uttered as "kotonaru")", "高速 (high speed; uttered as "kousoku")", "今後 (from now on; uttered as "kongo")" are displayed in the candidate display area 26*b* as plural candidate words beginning with "こ (uttered as "ko")" in the order of the decreasing occurrence frequency, these candidate words being shown divided in four rows. It is noted that candidate words displayed in the candidate display area 26*b* are a portion of the plural candidate words associated with the retrieving condition of "こ (uttered as "ko")", such that a large number of candidate words follow the candidate word "今後 (from now on; uttered as "kongo")" at the end of the lowermost row in the candidate display area 26*b*. The reason is that only a limited display area can be secured as the candidate display area 26*b*.

Of the candidate words displayed on the candidate display area 26*b* in FIG. 10, the candidate word, shown highlighted, represents a finalized candidate of a word to be input at the position of the cursor 46. If the letter finalizing key 47 is pushed in this state, the candidate word, shown highlighted, becomes a finalized word at the position of the cursor 46.

If, when the candidate word is not fixed, the jog dial 40 is rotated upwards (towards the LCD side) or downwards (towards the ten-key), the highlighted display of the candidate word shifts to the left or right side candidate words in the same row. If, when the candidate word at the trailing end of a row is shown highlighted, the jog dial 40 is rotated downwards, the highlighted display shifts to the leading end candidate word in the next lower row and, if, when a candidate word at the leading end of a row is shown highlighted, the jog dial 40 is rotated upwards, highlighted display shifts to the candidate word at the trailing end of the same row. If the jog dial 40 (roll 202) is thrust to turn the switch unit 206 on, the set of the candidate words, so far displayed in the candidate display area 26*b*, is switched to the next set of the candidate words.

By the above processing, a desired one of the candidate words displayed in the candidate display area 26*b* can be a candidate of the finalized word. In the embodiment of FIG. 10, the candidate word has not as yet finalized.

Figure 11:
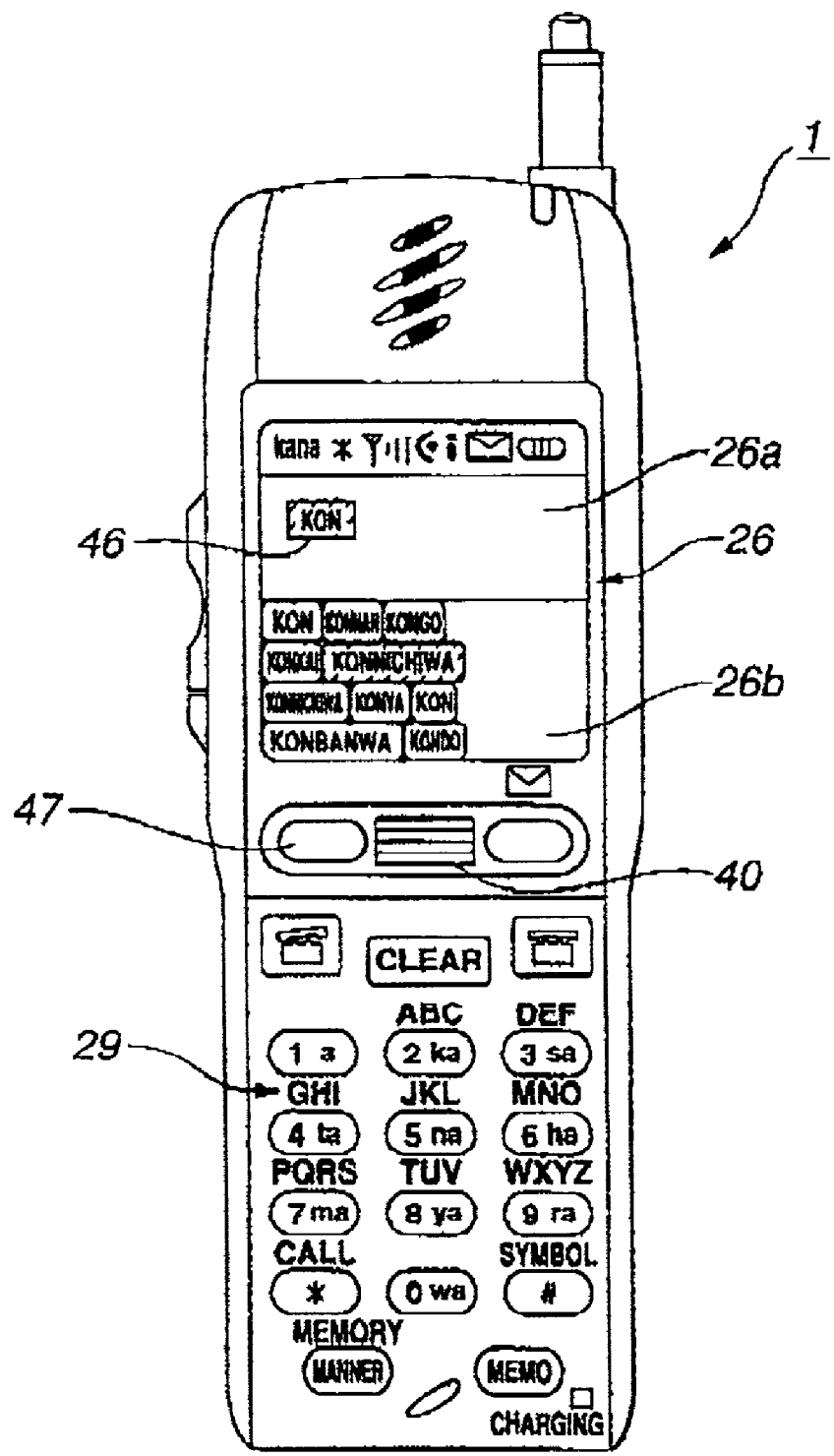
FIG. 11 illustrates an example in which a condition for retrieving "こん (uttered as "kon")" is input to an input displaying area and in which candidate words in meeting with the retrieving condition for retrieving "こん (uttered as "kon")" are displayed in a candidate display area.

If, as "こ (uttered as "ko")" is displayed on the cursor 46 of the input display area 26*a* and as yet no candidate word has been finalized, the [0] key, associated with "わ、を、ん (uttered as "wa, wo, and nn")", are pushed thrice to input the letter "ん (uttered as "nn")", "こん (uttered as "kon")" is displayed on the cursor 46 of the input display area 26*a*, as shown in FIG. 11. If "こん (uttered as kon)" is input, a set of plural candidate words beginning with "こん (uttered as "kon")" is displayed in the candidate display area 26*b*, with the letters "こん (uttered as "kon")" as the retrieving condition. In FIG. 11, as plural candidate words beginning with "こん (uttered as "kon")" displayed in the candidate display area 26*b*, "こん (uttered as "kon")", "困難 (difficult; uttered as "konnan")", "今後 (from now on; uttered as "kongo")", "今回 (this time; uttered as "konkai")", "こんにちは (hello; uttered as "konnichiwa")", "今日は (today; uttered as "konnnichiwa")" "今夜 (tonight; uttered as "kon-ya")", "紺 (dark blue; uttered as "kon")", "こんばんは (good evening; uttered as "konbanwa")", 今夜 (next time; uttered as "kondo")", are displayed, in the order of the decreasing occurrence frequency, these candidate words being displayed in four separate rows, as in the embodiment shown in FIG. 10. The candidate words displayed in the candidate display area 26*b* in this case represent a portion of the plural candidate words associated with "こん (uttered as "kon")", as the retrieving condition, so that, if the jog dial 40 is pushed to turn the switch unit on, the next set of candidate words can be displayed.

If the candidate word is not fixed, the jog dial 40 is rotated upwards (towards the LCD side) or downwards (towards the ten-key), the candidate word "こんにちは (hello; uttered as "konnichiwa")" among the candidate words displayed in the candidate display area 26*b* shown in FIG. 11 is shown highlighted and, in this state, the letter finalizing key 47 is pushed, "こんにちは (hello; uttered as "konnichiwa")" as the highlighted candidate word becomes the finalized word at the cursor 46 position.

Figure 12:
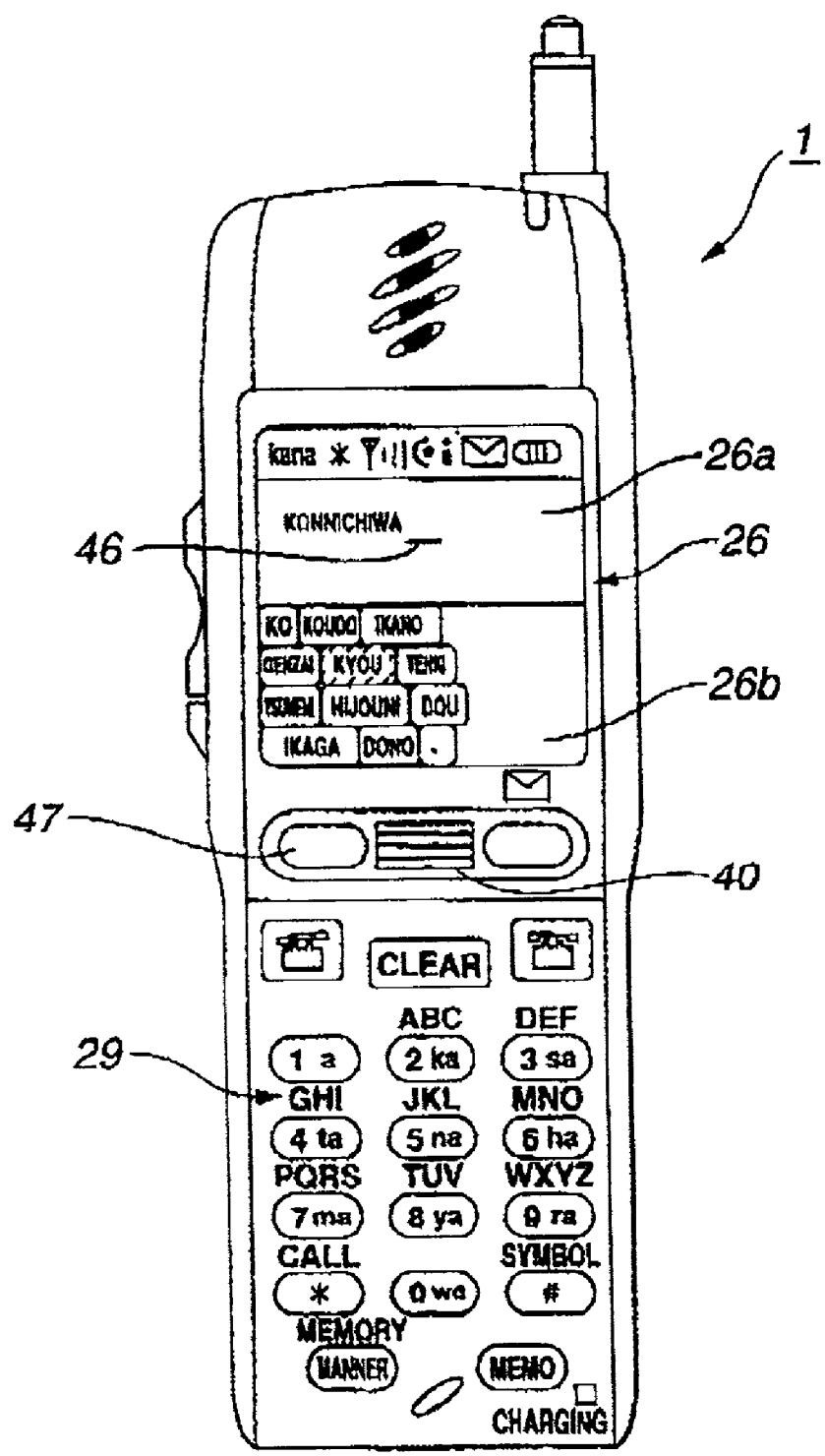
FIG. 12 illustrates an example in which a condition for retrieving "こんにちは (hello; uttered as "konnichiwa")" is input to an input displaying area and in which candidate words next following "こんにちは (hello; uttered as "konnichiwa")" are displayed in a candidate display area.

FIG. 12 shows the state in which "こんにちは (hello, uttered as konnichiwa)" becomes a finalized word and displayed in the input display area 26*a*. In FIG. 12, the word "こんにちは (hello; uttered as "konnichiwa")" is finalized, the cursor 46 shifts to a location on the left side of the last letter "は (uttered as "ha")" of "こんにちは (hello, uttered as "konnichiwa")". This sets an input queuing state for a new letter on the cursor 46.

In the candidate display area 26*b*, a set of plural candidate words which possibly follow "こんにちは (hello; uttered as "konnichiwa")" is displayed, with the word "こんにちは (hello; uttered as "konnichiwa")" just finalized on the input display area 26*a* as the retrieving condition. FIG. 12 shows an embodiment in which, for example, "こ (uttered as "ko")", "高度 (altitude; uttered as "koudo")", "以下の (following; uttered as "ikano")", "現在 (present; uttered as "genzai")", "今日 (today; uttered as "kyou")", "天気 (weather; uttered as "tenki")", "常に (always; uttered as "tsuneni")", "非常に (very; uttered as "hijouni")", "どう (how; uttered as "do")", "いかが (how are you; uttered as "ikaga")", "どの (which; uttered as "dono")","," are displayed as plural candidate words next following "こんにちは (hello; uttered as "konnichiwa")", in the order of the decreasing occurrence frequency, these being displayed in four separate rows, as before.

If, in this state, the jog dial 40 is rotated to shift the highlight the candidate word "今日 (today; uttered as "kyou")" among the candidate words displayed in the candidate display area 26*b* of FIG. 12, "今日 (today; uttered as "kyou")", as a candidate word, shown highlighted, becomes a finalized word at the cursor 46 position.

Figure 13:
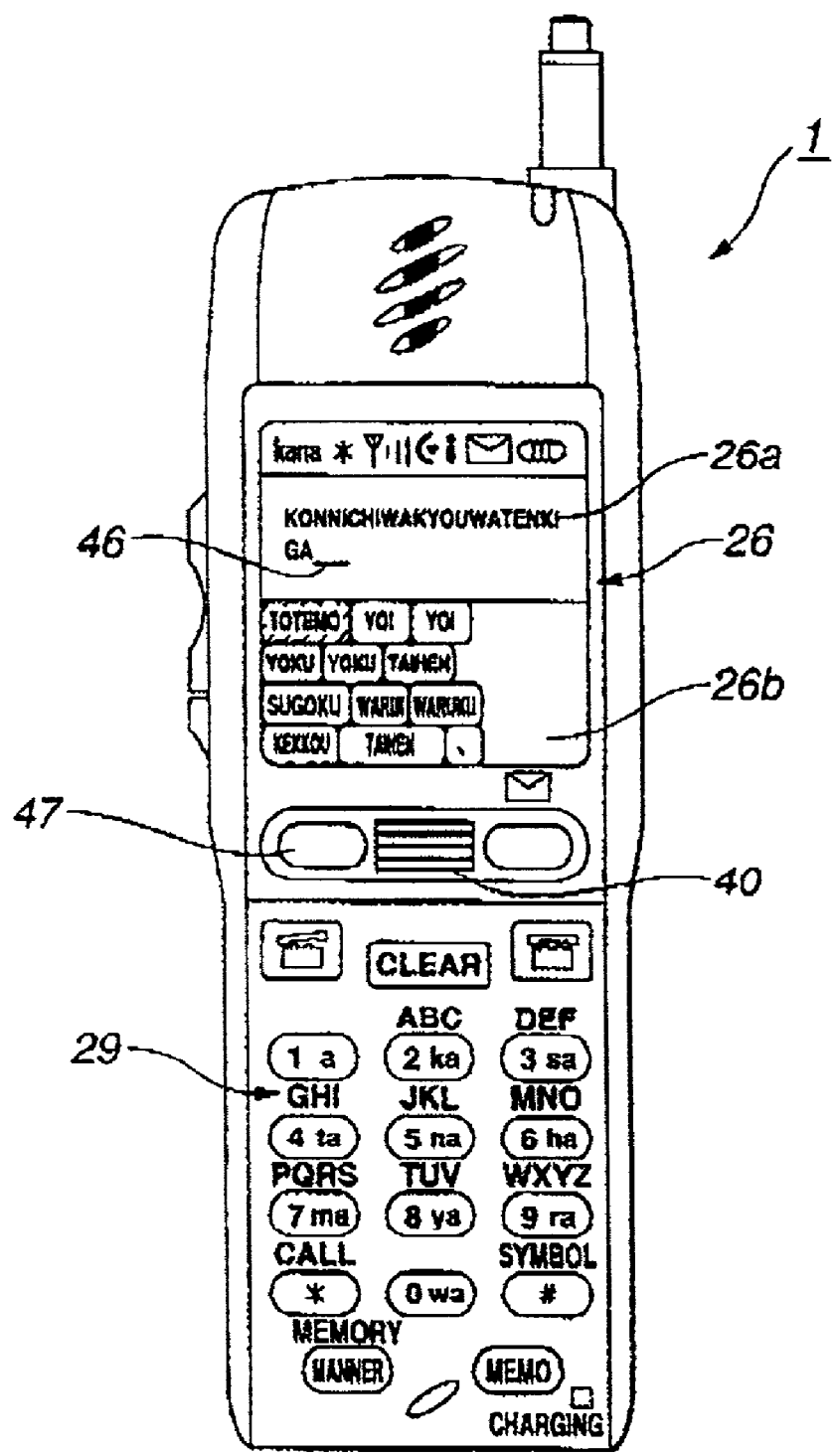
FIG. 13 illustrates an example in which a condition for retrieving "こんにちは今日は天気が (Hello. Today's weather; uttered as "konnichiwa kyouwa tenkiga")" is input to an input displaying area and in which candidate words next following "こんにちは今日は天気が (Hello. Today's weather is; uttered as "konnichiwa kyouwa tenkiga")" are displayed in a candidate display area.

FIG. 13 shows the display state of the LCD 26 when similar operations are repeated such that the text "こんにちは今日は天気が (Hello. Today's weather is; uttered as "konnichiwa kyouwa tenkiga")" has been input. Referring to FIG. 13, if the text "こんにちは今日は天気が (Hello. Today's weather is; uttered as "konnichiwa kyouwa tenkiga")" is finalized, the cursor 46 shifts to a position on the left side of the last word "天気が (weather is; uttered as "tenkiga")" of the text "こんにちは今日は天気が (Hello. Today's weather is; uttered as "konnichiwa kyouwa tenkiga")". This sets the new letter inputting queuing state on the cursor 46.

In the candidate display area 26*b*, a set of candidate words, which possibly come next to "天気が (weather is; uttered as "tenkiga")" is displayed, with the word just finalized on the input display area 26*a* as the retrieving condition. FIG. 13 shows an embodiment in which, for example, "とても (very; uttered as "totemo")", "よい (fine; uttered as "yoi")", "良い (fine; uttered as "yoi")", "よく (fine; uttered as "yoku")", "大変 (very; uttered as "taihen")", "すごく (very; uttered as "sugoku")", "悪い (bad; uttered as "warui")", "悪く (bad; uttered as "waruku")", "結構 (good; uttered as "kekkou")", "たいへん (very; uttered as "taihen")", "," are displayed, as plural candidate words next following the "天気が (weather is; uttered as "tenkiga")" just finalized on the candidate display area 26*a*, in the order of the decreasing occurrence frequency, these candidate words being displayed in four separate rows, as before.

If, in this state, the jog dial 40 is rotated to shift the highlighted candidate word "とても (very; uttered as "totemo")" among the candidate words displayed in the candidate display area 26*b* of FIG. 12, "とても (very; uttered as "totemo")", as a candidate word, shown highlighted, becomes a finalized word at the cursor 46 position.

Figure 14:
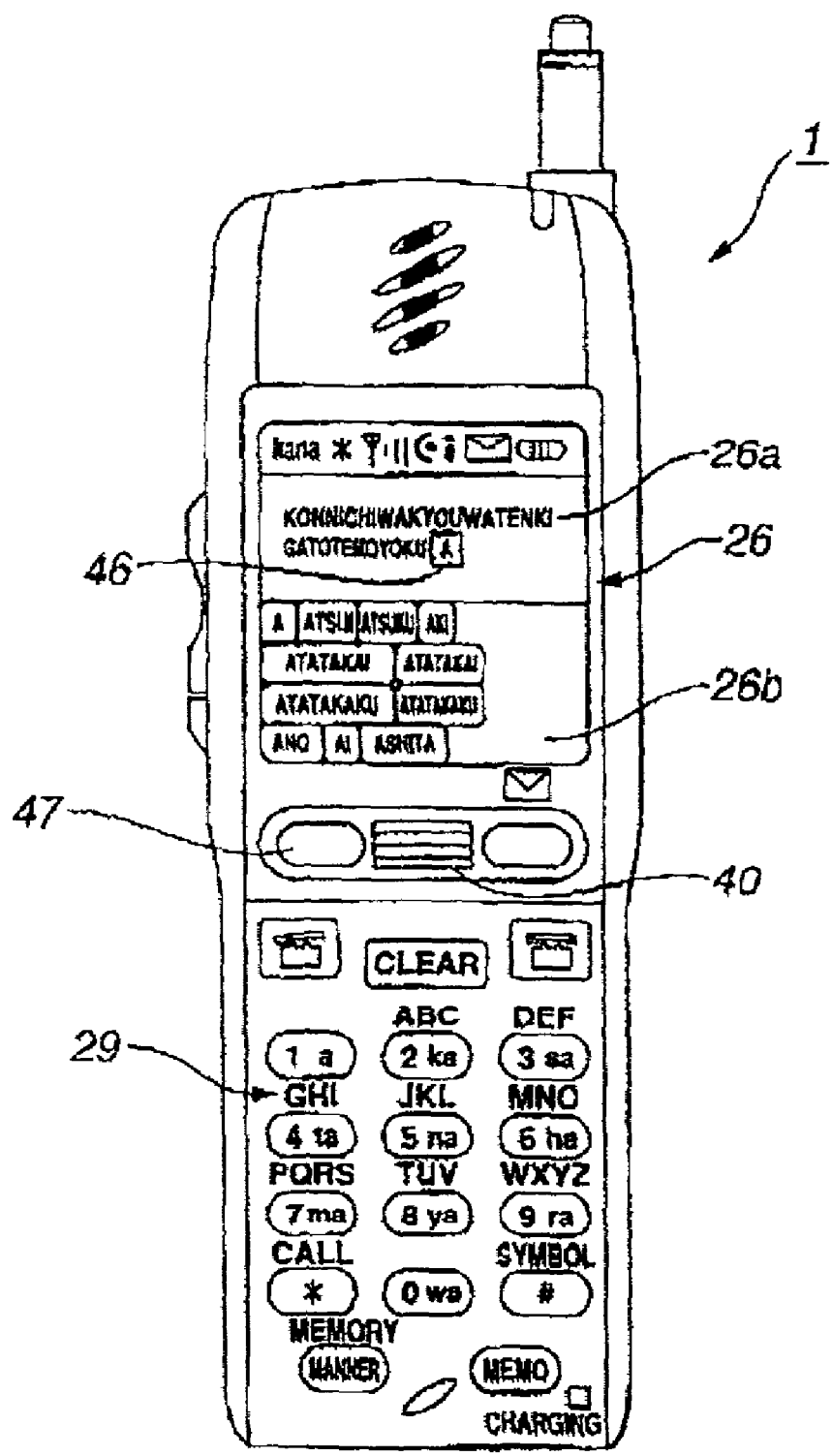
FIG. 14 is a illustrates an example in which a condition for retrieving "あ (uttered as "a")" is input to an input displaying area and in which candidate words in meeting with the retrieving condition for retrieving "あ (uttered as "a")" are displayed in a candidate display area.

FIG. 14 shows the display state of the LCD 26 when similar operation are repeated such that, when the text up to "こんにちは今日は天気がとても良く (Hello. Today's weather is very fine; uttered as "konnichiwa kyouwa tenkiga totemoyoku")", for example, is finalized, with the cursor 46 being shifted to a position on the left side of "良く (fine; uttered as "yoku")" as the last word of the text to wait for the next input, the key [1] to which is associated the "あ (uttered as "a")-row, the first hiragana row" is thrust once to display the letter "あ (uttered as "a")".

If the text up to "こんにちは今日は天気がとても良く (Hello. Today's weather is very fine; uttered as "konnichiwa kyouwa tenkiga totemoyoku")" is finalized, and further "あ (uttered as "a")" is input, a set of plural candidate words beginning from "あ (uttered as "a")" is displayed in the candidate display area 26*b*, with the letter "あ (uttered as "a")" next following the text "こんにちは今日は天気がとても良く (Hello. Today's weather is very fine, uttered as "konnichiwa kyouwa tenkiga totemoyoku")" as the retrieving condition. FIG. 14 shows an embodiment in which, for example, "あ (uttered as "a")", "暑い (hot; uttered as "atsui")", "暑く (hot; uttered as "atsuku")" "秋 autumn; uttered as "aki")", "あたたかい (warm; uttered as "atatakai")", "暖かい (warm; uttered as "atatakai")", "あたたかく (warm; uttered as "atatakaku")", "暖かく (warm; uttered as "atatakaku")", "あの (that; uttered as "ano")", "愛 (love, uttered as "ai")", "あした (tomorrow; uttered as "ashita")" are displayed, as plural candidate words beginning with "あ (uttered as "a")" displayed in the candidate display area 26*b*, in the order of the decreasing occurrence frequency, these candidate words being displayed in four separate rows, as before.

Figure 15:
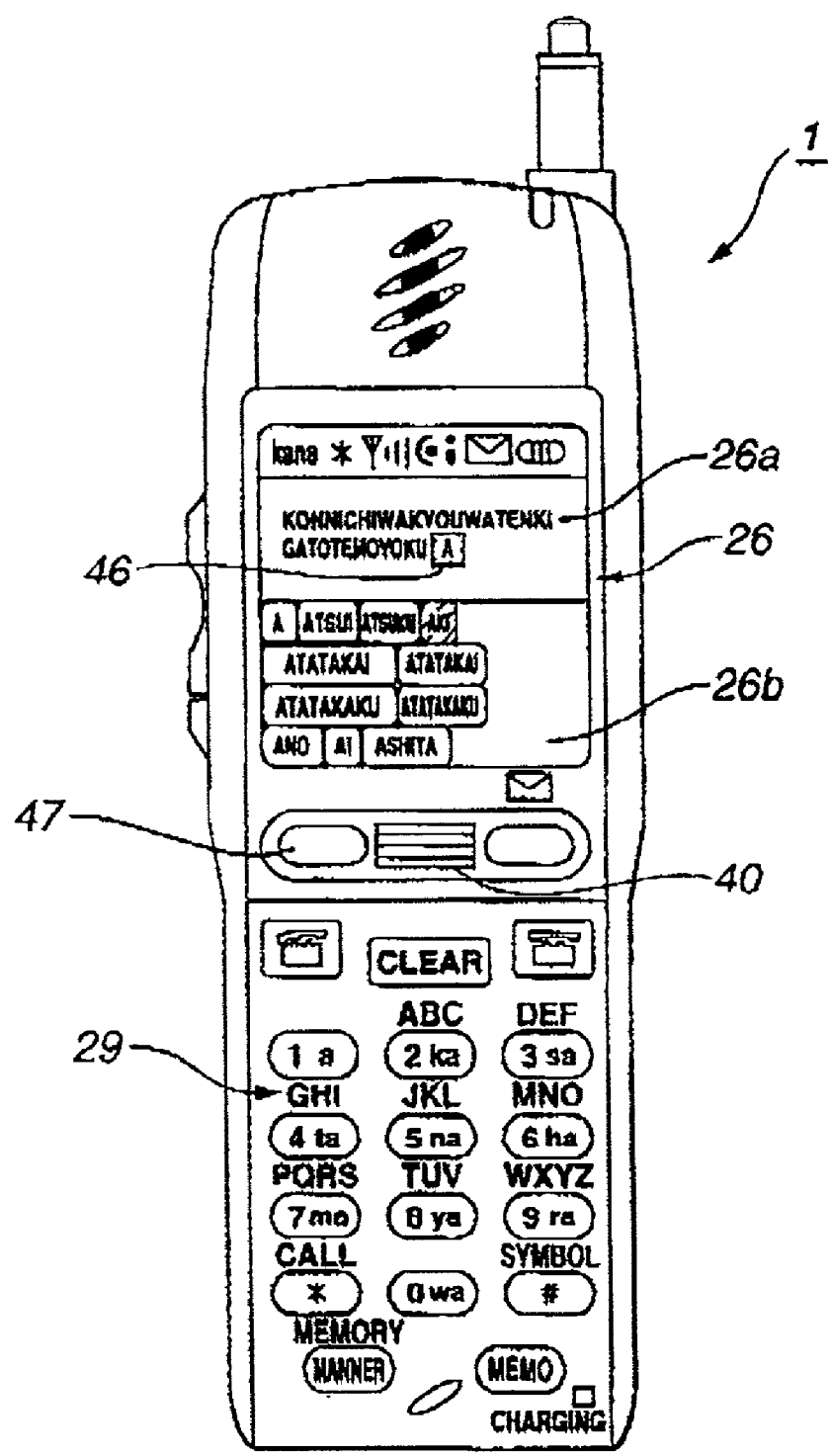
FIG. 15 illustrates how "秋 (autumn; uttered as "aki")" is selected from the candidate words in meeting with the retrieving condition for "あ (uttered as "a")".

If, in this state, the jog dial 40 is rotated, the candidate word "秋 (autumn; uttered as "aki")" among the candidate words displayed on the candidate display area 26*b*, as shown in FIG. 15, and the letter finalizing key 47 is pushed in this state, "秋 autumn; uttered as "aki")" shown highlighted becomes finalized as a word at the cursor 46 position.

Figure 16:
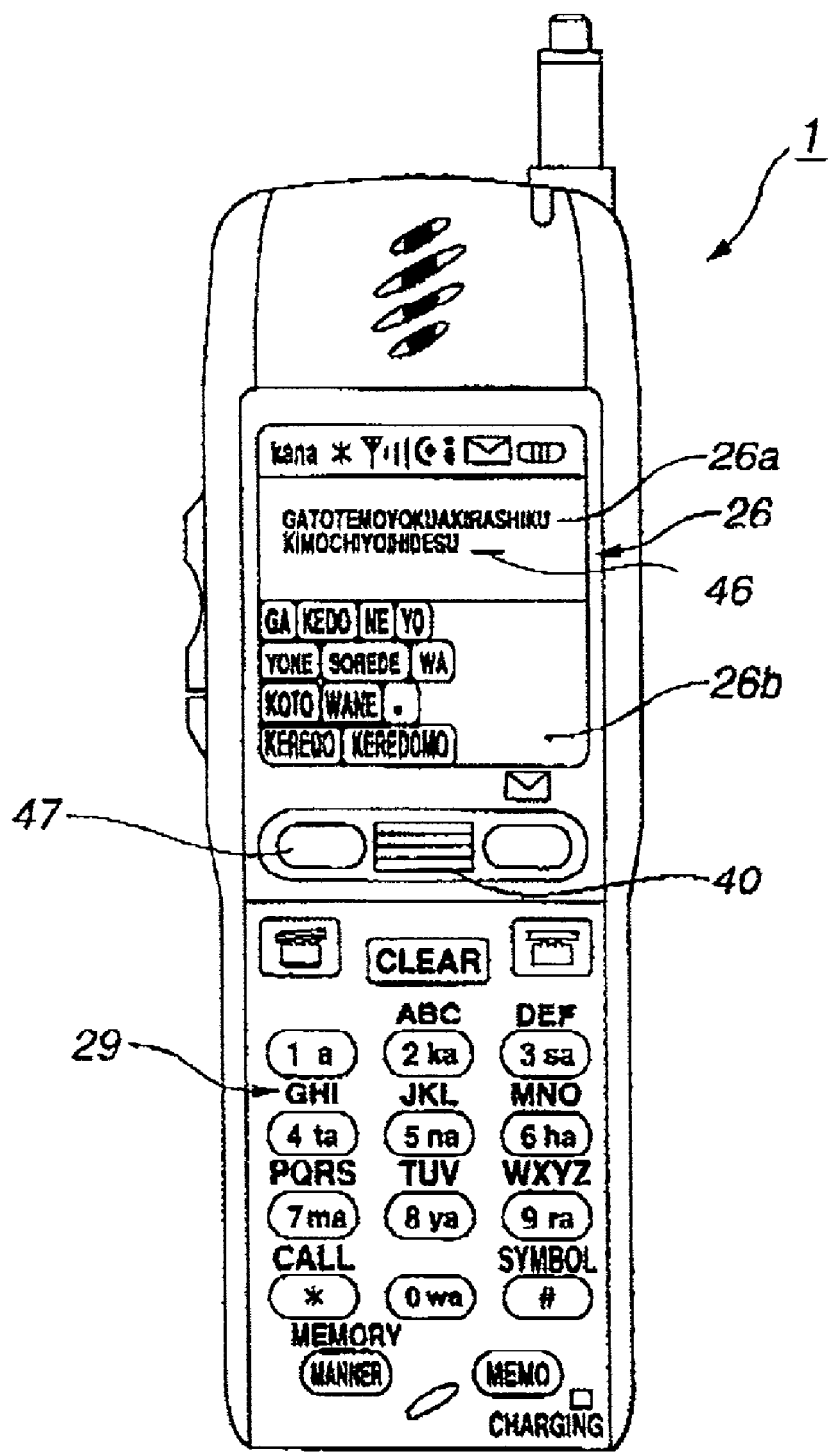
FIG. 16 illustrates the state in which formulation of a full sentence has been completed.

It is assumed that, as a result of repetition of the similar operations, the text up to "こんにちは今日は天気がとても良く秋らしく気持ちよい日です。(Hello. Today's weather is very fine and autumn-like and comfortable.; uttered as "konnichiwa kyouwa tenkiga totemoyoku akirashiku kimochiyoi hidesu")" is finalized. If the text is long, as in this case, the entire text cannot be displayed in the input display area 26*a* of the limited display area, so that the rows go upwards beginning from the row close to the leading end, that is, cease to be displayed in the input display area 26*a*. FIG. 16 shows a state in which "こんにちは今日は天気がとても良く秋らしく気持ちよい日です。(Hello. Today's weather is very fine and autumn-like and comfortable.; uttered as "konnichiwa kyouwa tenkiga totemoyoku akirashiku kimochiyoi hidesu")" is finalized and the cursor 46 is shifted to the left of the last period mark "。(.)" to wait for the next input.

The above finalizes the letter string "こんにちは今日は天気がとても良く秋らしく気持ちよい日です。(Hello. Today's weather is very fine and autumn-like and comfortable.; uttered as "konnichiwa kyouwa tenkiga totemoyoku akirashiku kimochiyoi hidesu")"

It is seen from above that, with the portable telephone set 1 of the present embodiment, the text of e.g., an E-mail can be formulated easily and speedily with a smaller number of operations than with a conventional portable telephone set. Although the present embodiment is directed to creating the Japanese text in need of conversion processing, such as kana-kanji conversion processing, it is possible with the present embodiment not only to create the text of a language not in need of conversion processing, such as English, French or German, but also to create the text easily and speedily by a smaller number of operations. In particular, since English words are selected from the aforementioned plural candidate words and input, it may be premeditated that spell checking necessarily required in inputting the text of, for example, English, might become unnecessary.

Figure 17:
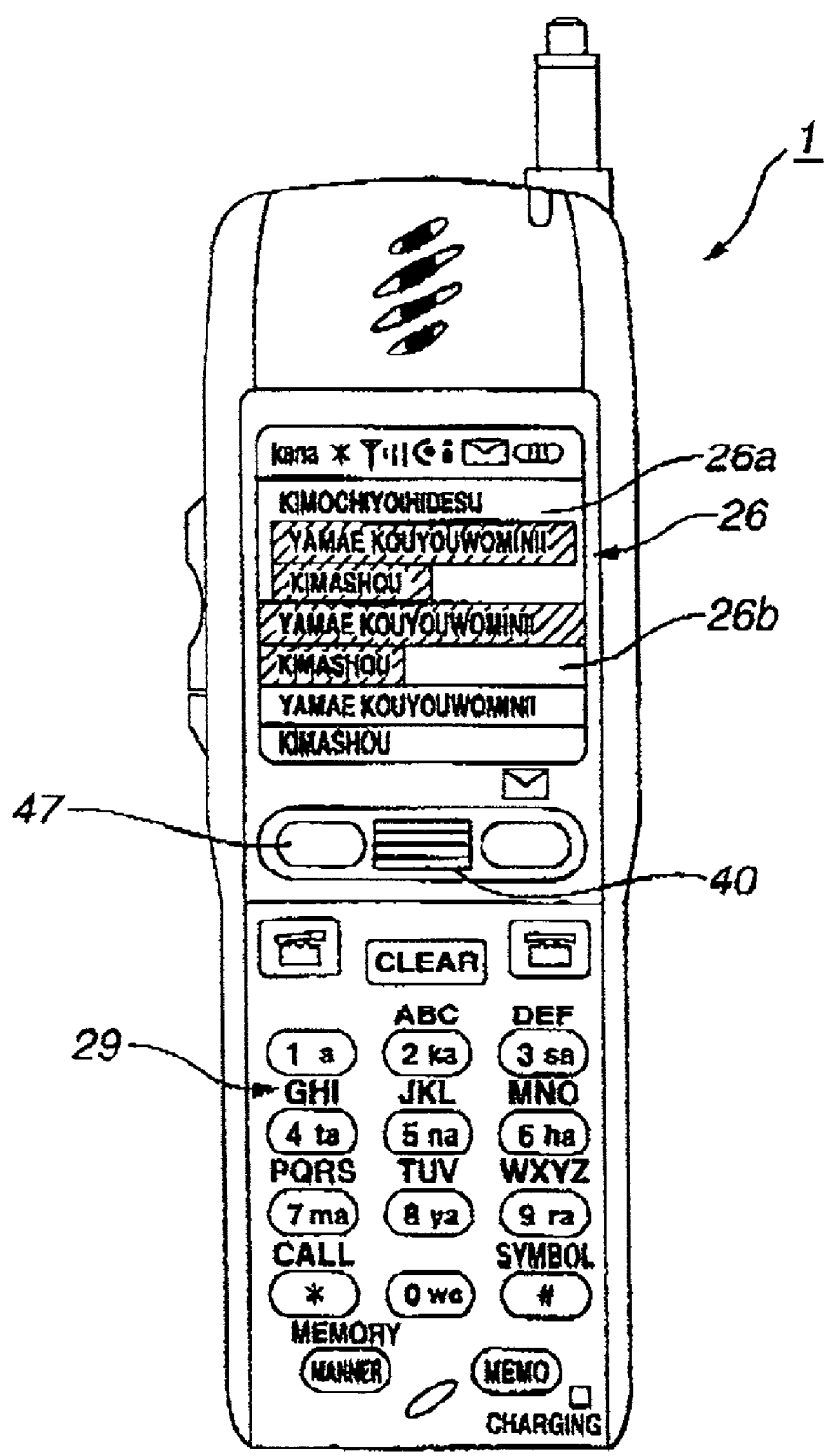
FIG. 17 illustrates conversion of plural interconnected paragraphs.

In the embodiments, described above, words are individually finalized to create the text. In the portable telephone set 1 of the present embodiment, it is possible to adaptively link the conjunctive paragraph conversion with the aforementioned predictive candidate retrieval conversion. FIG. 17 shows exemplary display of a state in which, by sequentially operating the ten key 29 after finalizing the text of FIG. 16, each letter of e.g., the text "やまへこうようをみにいきましょう。(let's go to a mountain to see tinged autumnal leaves.; uttered as "yamae kouyouwo mini ikimashou")" is input but not as yet highlighted (highlighted state).

In the candidate display area 26*b* at this time, a set of candidate words (candidate paragraphs) "やまへこうようをみにいきましょう。(let's go to a mountain to see tinged autumnal leaves.; uttered as "yamae kouyouwo mini ikimashou")" is displayed in case of conjunctive paragraph conversion of unfinalized letter string input in the input display area 26*a*. In FIG. 17, candidate words "やまへこうようをみにいきましょう。(let's go to a mountain to see tinged autumnal leaves.; uttered as "yamae kouyouwo mini ikimashon")", "山へ紅葉を見に行きましょう。(let's go to a mountain to see tinged autumnal red leaves.; uttered as "yamae kouyouwo mini ikimashou")" or "山へ紅葉を見に行きましょう。(let's go to a mountain to see tinged autumnal yellow leaves.; uttered as "yamae kouyouwo mini ikimashou")" are displayed in four separate rows, as described previously.

Figure 18:
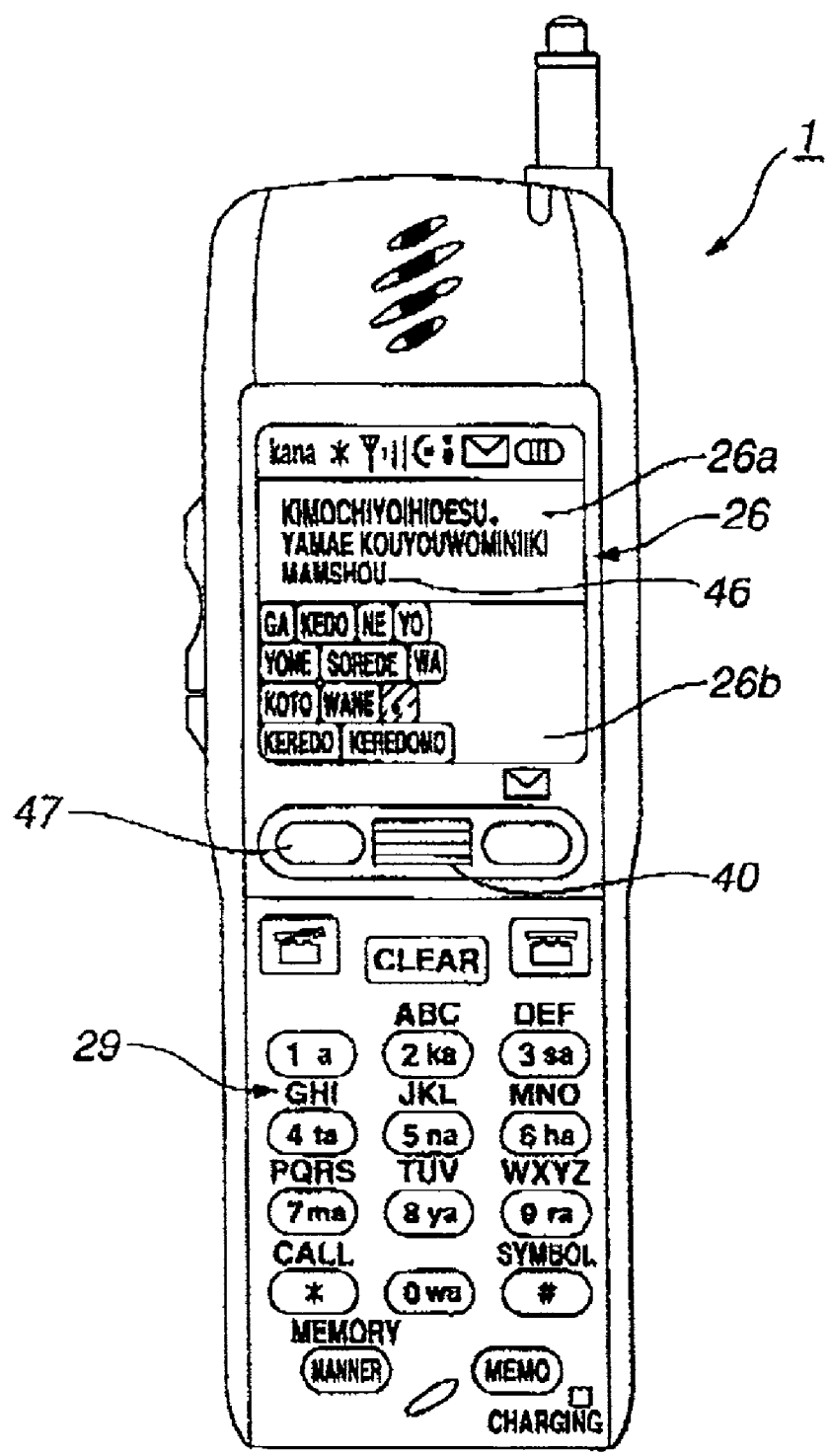
FIG. 18 illustrates the state in which formulation of a sentence by conversion of plural interconnected paragraphs has come to a close.

If now the jog dial 40 is rotated to display the candidate words "山へ紅葉を見に行きましょう。(let's go to a mountain to see tinged autumnal red leaves.; uttered as "yamae kouyouwo mini ikimashou")", for example, in a highlighted state, and the letter finalizing key 47 is pressed in this state, the candidate words "山へ紅葉を見に行きましょう。(let's go to a mountain to see tinged autumnal red leaves.; uttered as "yamae kouyouwo mini ikimashou")", thus displayed, become the finalized words at the cursor 46 position (conjunctive paragraph converted text). FIG. 18 shows exemplary display on the LCD 26 when the above "山へ紅葉を見に行きましょう。(let's go to a mountain to see tinged autumnal red leaves.; uttered as "yamae kouyouwo mini ikimashou")" has been finalized.

Figure 19:
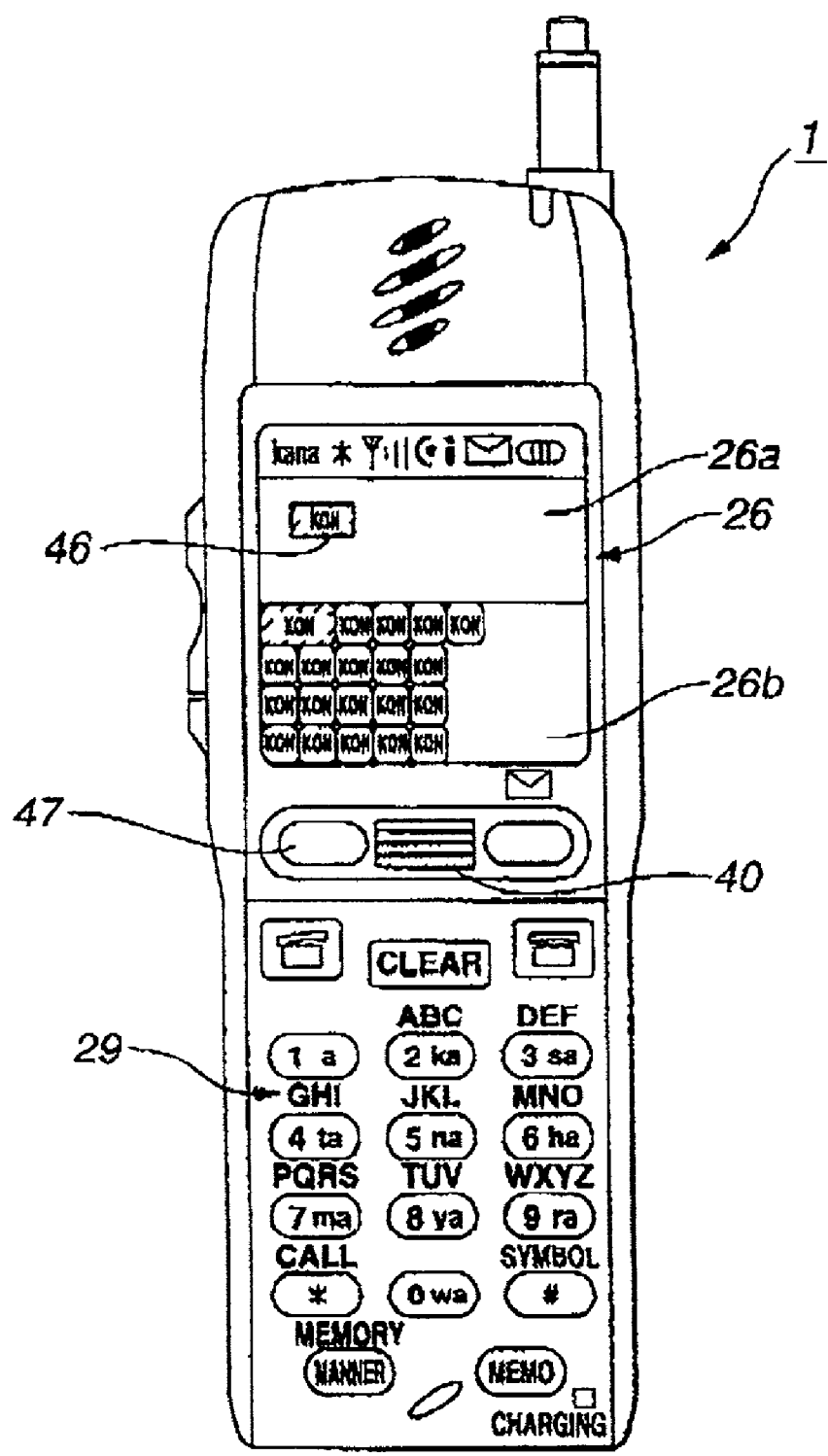
FIG. 19 illustrates simple conversion.

In the present embodiment of the portable telephone set 1, simple conversion can be adaptively linked to the aforementioned predictive candidate retrieval conversion. FIG. 19 shows exemplary display in which the ten key 29 is sequentially operated to input e.g., letters of "こん (uttered as "kon")" is input but is as yet not finalized, that is in the highlighted display state.

In the candidate display area 26b, there are displayed a set of candidate words in case "こん (uttered as "kon")", which is an unfinalized letter string input in the input display area 26a, is subjected to simple conversion. FIG. 19 shows the state in which candidate words resulting from simple conversion of "こん (uttered as "kon")", that is "こん (uttered as kon")", "紺 (dark blue; uttered as "kon")", "根 (root;-uttered as "kon")", "今 (now; uttered as "kon")", "婚 (marriage; uttered as "kon")", "混 (mix; uttered as "kon")", "近 (near; uttered as "kon")", "金 (gold; uttered as "kon")" are displayed, these candidate words being displayed in four separate rows, as described above.

If now the jog dial 40 is rotated to highlight the desired candidate word and the character finalizing key 47 is pushed, the candidate word, indicated highlighted, is finalized.

In the present embodiment of the portable telephone set 1, described above, as described in connection with FIGS. 9 to 16, the load in the text inputting operation is relieved, without giving an alien feeling to users accustomed to the kana-kanji conversion operation, by properly dealing with all of the predictive candidate retrieval conversion of selecting desirable words from unfinalized input letters or plural candidate words predicted from the words just finalized, conjunctive paragraph conversion explained in connection with FIGS. 17 and 18 and the kana-kanji conversion, such as simple conversion, explained with reference to FIG. 19, and by adaptively linking these conversion simu techniques, that is by activating the kana-kanji converting function unit 16 simultaneously.

Figure 20:
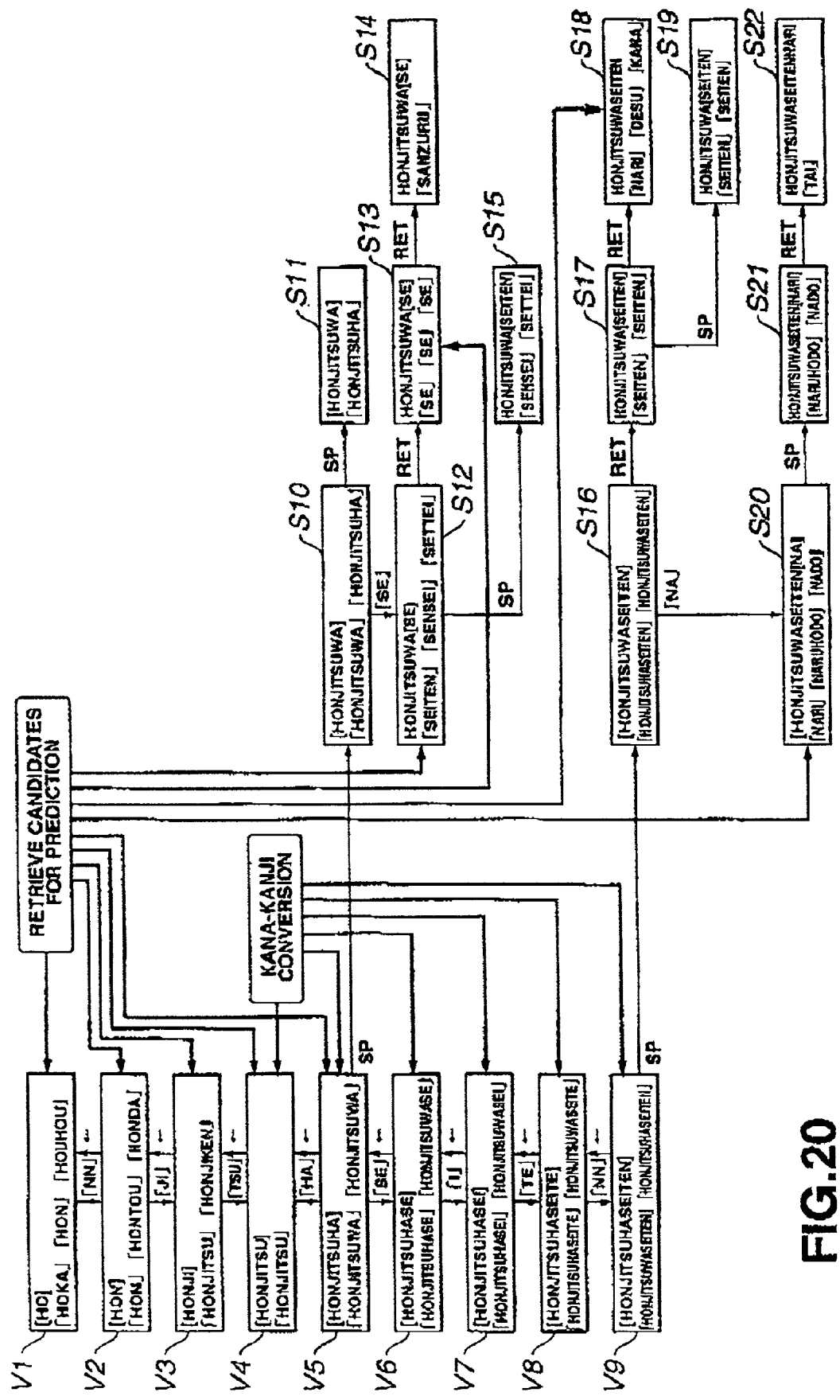
FIG. 20 illustrates predictive candidate retrieval and kana-kanji conversion links.

FIG. 20 shows the manner of linking the aforementioned predictive candidate retrieval conversion and kana-kanji conversion described above. Meanwhile, FIG. 20 shows how, in creating the text reading "本日は晴天なり (today is fine; uttered as "honjitsuwa seiten nari")", predictive candidate retrieval and kana-kanji conversion take part in effecting the conversion. Meanwhile, SP in FIG. 20 indicates the selecting operation of the candidate words caused by the rotation of the jog dial 40, while RET in FIG. 20 indicates that the display is switched to the next set of candidate words by pushing e.g., the jog dial 40 (jog push).

If e.g., a letter "ほ (uttered as "ho")" is input and set as a retrieving condition, candidate words such as "他 (others; uttered as "hoka")", "本 (book; uttered as "hon")" or "方法 (method; uttered as "houhou")", are displayed by predictive candidate retrieval, as indicated at VI in FIG. 20.

If then a letter "ん (uttered as "nn")" is input, such that "ほん (uttered as "hon")" is set as retrieving condition in conjunction with "ほ (uttered as "ho")", candidate words such as "本 (book; uttered as "hon")", "本当 (truth; uttered as "hontou")" or "本田 (name of a person; uttered as "honda")" by predictive candidate retrieval are displayed.

When next a letter "じ (uttered as "ji")" is input such that "ほんじ (uttered as "honji")" is set as retrieving condition in conjunction with "ほん (uttered as "hon")", candidate words such as "本日 (today; uttered as "honjitsu")" or "本事件 (present incident; uttered as "honjiken")" by predictive candidate retrieval are displayed in the display picture, as indicated at V3 in FIG. 20.

When next a letter "つ (uttered as "tsu")" is input such that "ほんじつ (uttered as "honjitsu")" is set as retrieving condition in conjunction with ほんじ (uttered as "honji")", a candidate word such as "本日 (today; uttered as "honjitsu")" is displayed in the display picture, by predictive candidate retrieval and kana-kanji conversion, as indicated at V4 in FIG. 20.

When next a letter "は (uttered as "ha")" is input such that "ほんじつは (uttered as "honjitsuha")" is set as retrieving condition in conjunction with "ほんじつ (uttered as "honjitsu")", candidate words such as 本日は (today is; uttered as "honjitsuwa")" or "本実は (actual fact is; uttered as "honjitsuwa")" are displayed in the display picture, by predictive candidate retrieval and kana-kanji conversion, as indicated at V5 in FIG. 20.

When next a letter "せ (uttered as "se")" is input such that "ほんじつはせ (uttered as "honjitsuhase")" is set as retrieving condition in conjunction with "ほんじつ (uttered as "honjitsuha")", candidate words such as "本日長谷 (today, Mr. HASE; uttered as "honjitsuhase")" or "本実は背 (actual fact is a back; uttered as "honjitsuwase")" are displayed in the display picture, by predictive candidate retrieval and kana-kanji conversion, as indicated at V6 in FIG. 20.

When next a letter "い (uttered as "i")" is input that "ほんじつはせい (uttered as "honjitsuhasei")" is set as retrieving condition in conjunction with "ほんじつはせ (uttered as "honjitsuhase")", candidate words such as "本日派生 (today derivation; uttered as "honjitsuhasei")" or "本実は性 (actual fact is nature; uttered as "honjitsuwasei")" are displayed in the display picture, by predictive candidate retrieval and kana-kanji conversion, as indicated at V7 in FIG. 20.

When next a letter "て (uttered as "te")" is input such that "ほんじつはせいて (uttered as "honjitsuhaseite")" is set as retrieving condition in conjunction with "ほんじつはせい (uttered as "honjitsuhasei")", candidate words such as "本日は急いて (today rapidly; uttered as "honjitsuwaseite")" or "本実は急いて (actual fact is rapidly; uttered as "honjitsuwaseite")" are displayed in the display picture, by predictive candidate retrieval and kana-kanji conversion, as indicated at V8 in FIG. 20.

When next a letter "ん (uttered as "nn")" is input such that "ほんじつはせいてん (uttered as "honjitsuhaseiten")" is set as retrieving condition in conjunction with "ほんじつはせいて (uttered as "honjitsuhaseite")", candidate words such as "本日は晴天 (today is fine; uttered as "honjitsuwaseiten")" or "本日長谷移転 (today, Mr. HASE will move; uttered as "honjitsuhaseiten")" are displayed in the display picture, by predictive candidate retrieval and kana-kanji conversion, as indicated at V9 in FIG. 20.

If, as the display of V5 in FIG. 20 is made, the jog dial 40 is rotated (jog rotation SP), selection is sequentially made beginning from "本日は (today is; uttered as honjitsuwa)" as a first candidate word as indicated in V10 and V11 in FIG. 20. If the display V10 in FIG. 20 is made, "本日は (today is; uttered as "honjitsuwa")" is finalized by the letter finalizing key 47, and subsequently e.g., a letter "せ (uttered as "se")" is input, candidate words "晴天 (fine; uttered as "seiten")", "先生 (teacher; uttered as "sensei")" and "設定 (setting; uttered as "settei")" are displayed on the display picture, by predictive candidate retrieval conversion, as shown at V12 in FIG. 20. If, as the display V12 is made in FIG. 20, the jog push RET is made, the candidate word is switched to the next candidate word, as indicated at V13 in FIG. 20. If the candidate word "い (uttered as "se")" is finalized, as indicated at V in FIG. 20, the display picture is as shown at V14. If jog rotation SP is made as V12 in FIG. 20, the first candidate word "晴天 (fine; uttered as "seiten")", as the first candidate words, is selected.

If, as the display of V9 is made in FIG. 20, jog rotation SP is made, the first candidate word "本日は晴天 (today is fine; uttered as "honjitsuwaseiten")", as the first candidate word, is selected, as indicated at V16. If, as the display V16 is made in FIG. 20, the jog push RET is made, the candidate word is switched to the next candidate word, as indicated at V17 in FIG. 20. If the candidate word "晴天 uttered as "seiten")" is finalized, the display picture is as shown at V18. If jog rotation SP is made as V172 in FIG. 20, the first candidate word "急いてん (rapidly; uttered as "seiten")", as the first candidate words, is selected, as indicated at V19.

If, as the display at V16 is made, a letter "な (uttered as "na")" is input, candidate words such as "なり (is; uttered as "nari")", "なるほど (Indeed; uttered as "narruhodo")" or "など (and so on; uttered as "nado")" by predictive candidate retrieval conversion are displayed in the display picture, as indicated in V20. If jog rotation SP is made in this state, the first candidate word "なり (is; uttered as "nari")" is selected. If further a jog push RET is made, the candidate word is sequentially switched to the next candidate word as indicated at V22.

Meanwhile, in order to effectively realize the information inputting technique according to the present embodiment, described above, a word dictionary and a dictionary of exemplary texts of high quality are required as standard dictionary and status dependent dictionary.

For example, as a word dictionary used in the present embodiment for inputting the text in Japanese, the type of the dictionary shown for example in FIG. 21 may be contemplated. The word dictionary of the type shown in FIG. 21 is of a list structure made up of the reading (reading of the candidate word) as a first element, and candidate words as a second element, shown on the left and right sides, respectively, in FIG. 21.

As a dictionary of exemplary sentences for inputting Japanese texts, used in the present embodiment, such a type of the dictionary shown for example in FIG. 22 may be contemplated. The dictionary of exemplary sentences of the type shown in FIG. 22 is of a list structure made up of a first element, representing the letter string finalized as the retrieving condition, a second element, representing the reading of candidate words, and a third element, representing the candidate words, shown on the left side, at a mid portion and on the right side, respectively, in FIG. 22. That is, if, in the dictionary of the exemplary sentences, the character string of the second element is matched to the character string directly ahead of an input point, and the retrieving condition (reading) of the first element, shown on the left side of FIG. 21, is specified, the character string of the third element, shown on the right side thereof, is finalized as a candidate word.

If, in the present embodiment, a candidate word is to be retrieved responsive to the retrieving condition, the above-described retrieving guidelines can be realized simply by performing the matching operations beginning from the leading end of the dictionary shown in FIGS. 21 and 22.

Moreover, the dictionaries shown in FIGS. 21 and 22 is of such a structure which permits facilitated retrieval of previously formulated texts with the use of the learning functional unit 14 of the CPU 13. That is, since the words or exemplary texts, selected in preparing the text, are adapted to be added at the beginning portions of these dictionaries, the words or exemplary sentences, so added at the leading ends, are represented preferentially as candidate words on the occasion of the next retrieval, thus facilitating re-inputting of the text which is alike the text input directly previously.

Meanwhile, if a word dictionary of 22000 words, for example, is used, 471 candidate words, for example, may be selected by [selection of the reading of the first one character+selection of a candidate word in a candidate display area], whilst 8611 candidate words, for example, may be selected by [selection of the reading of the first one character+selection of a candidate word in a candidate display area]. It is noted that, if ten candidate words, for example, are demonstrated in the candidate display area, the probability that the candidate words desired to be selected in the exemplary sentences, among the 471 candidate words, appear in the candidate display area by performing [selection of the reading of the first one character+selection of a candidate word in a candidate display area] is 44%, whilst the probability that the candidate words desired to be selected in the exemplary sentences, among the 8611 candidate words, appear in the candidate display area by performing [selection of the reading of the first two characters+selection of a candidate word in a candidate display area] is 85%. If [selection of the reading of the first one character+selection of a candidate word in a candidate display area] is performed, the probability that the candidate words desired to be selected in the exemplary texts is not less than 97%. So, with the prediction candidate retrieval processing for candidate words of the present embodiment, almost all of the candidate words required in inputting the text can be selected simply by specifying the reading of only one or two characters.

It is noted that the above values of the probability of occurrence are those for a case in which prediction candidate retrieval of predicting the candidate words of the highest occurrence frequency from the aforementioned already finalized character string is not used. In actuality, the frequency of occurrence of the candidate words required is increased further by the functioning of the prediction candidate retrieval, so that words can be input in many cases even if no reading as the retrieving condition is specified, as in the aforementioned embodiment.

Moreover, in the present embodiment, different dictionaries can be used depending on the using time or site or the user of the portable telephone set, or the context or the application using state, thereby enabling mote effective texts to be input.

That is, in the kana-kanji conversion system, currently in widespread use, a so-called [user dictionary] which permits a user to input different words, is routinely used in addition to a standard dictionary common to all users, that is a standard dictionary stored in a standard dictionary storage area 20 of the memory 17. The use of this [user dictionary] is an extremely effective technique in adapting the kana-kanji conversion system to users at large. Taking into consideration that the use of the [user dictionary] which permits the user to register optional words is effective in text inputting, it may be contemplated that, if other different dictionaries are used depending in a variety of situations, most proper conversion can presumably be made with advantage in the variety of situations.

Thus, in the present embodiment, situation dependent dictionaries, adaptively variable depending on the user situation, are stored, in addition to the user dictionary, in the memory 17 (situation dependent dictionary storage area 21) to enable an optimum prediction candidate conversion) dependent on the user situation.

As the above-mentioned situation, there may be an application program, the position of an input text (input context), place, time and the user orientation.

By way of an example of using the aforementioned application program dependent dictionaries, different dictionaries are provided from one application to be in use to the next, these different dictionaries being preferentially used. For example, if dictionaries containing words such as "会議 (conference; uttered as "kaigi")" or "打ち合わせ (negotiations; uttered as "uchiawase")" are preferentially used in an application for schedule memo, and place name dictionaries are preferentially used in an address book, the "会議 (conference; uttered as "kaigi")" is predicted on entering [k] in the address book, whilst " 神奈川県 (Kanagawa prefecture; uttered as "kanagawa-ken")", for example, is predicted on entering [k] in the address book. In the present embodiment of the portable telephone set 1, prediction candidate retrieval of candidate words is made from the memory 17, in the prediction candidate retrieving function unit 15, based on the application program in use, with the aid of the aforementioned application dependent dictionary, as shown in FIG. 1. Meanwhile, as a technique for installing the application dependent dictionaries, such a technique may be contemplated in which the user switches to different dictionaries depending on the type of the application in use. For example, by providing different dictionaries in the memory medium 43 from one sort of the application program to another, and by using the memory medium 43 having stored therein the dictionary suited to the application in use, analogous dictionaries may be used in analogous applications of different equipment (portable telephone set). Moreover, such a system may be contemplated in which each application holds a dictionary. This system is convenient since the character string to be used in an application may be automatically specified by the application. In addition, such a system may be contemplated in which an application dependent dictionary sent from e.g., a server as a data packet is received and used. This system has an advantage that the latest application dependent dictionary may be usable.

By way of a using example of the input context dependent dictionary, a name dictionary is preferentially used in a line including a character string [To:] at the leading end of a line. This permits e.g., facilitated address inputting. In the present embodiment of the portable telephone set 1, prediction candidate retrieval of candidate words is effected from the memory 17 in the prediction candidate retrieving function unit 15, based on the input context, using the input context dependent dictionary. As the technique for installing the input context dependent dictionary, such a system may be contemplated in which the input context dependent dictionary is switched through the memory medium 43 or the dictionary transmitted from e.g., a server as a data packet, as in the case of the application dependent dictionary mentioned above.

As a use example of the place dependent dictionary, a place name dictionary is provided and a place name dictionary matched to the current place is preferentially used. This allows to input the name of a near-by place readily. For example, if [u] is input at the Shibuya station, "宇田川町 (name of a town; uttered as "Utagawa-machi")" becomes a candidate, whereas, if [u] is input at Tokyo station, "上野 (name of a town; uttered as "Ueno")" becomes a candidate. In the case of a place name dictionary, place names as candidate words can easily be retrieved and specified if a hierarchical structure is formed in the order of ken (prefecture), gun (ward), shi (city), machi (town), mura (village) and banchi (house address). In order to render the place dependent dictionary usable, the present embodiment of the portable telephone set 1 is provided with a position detection unit 22 shown in FIG. 1. Based on the position information, detected by the position detection unit 22, candidate words are retrieved, by way of prediction candidate retrieval, using the place dependent dictionary from the memory 17. As a method for installing the place dependent dictionary, such a technique is used in which the current position is grasped from the position detection unit 22 of the portable telephone set 1 to switch the dictionaries to be in use. Such a technique may also be contemplated in which dictionary data pertinent to the current position and its near-by area is received from e.g., an electronic equipment of a user in the near-by area of the current position, or in which dictionary data is received from a dictionary server provided in the vicinity of the current position. This gives such a merit that the most pertinent candidate word can be predicted no matter where the portable telephone set 1 is located. In the case of the place dependent dictionaries, it may be contemplated to switch the input place dependent dictionaries through the memory medium 43 or to switch the dictionaries sent from e.g., a server as a data packet.

As a use example of the time dependent dictionary, different dictionaries are provided depending e.g., on the time because the words used may be changed depending on time, even with the same user and with the same site. For example, such words as "帰宅 (coming home; uttered as "kitaku")", "宴会 (banquet, uttered as "ennkai")", "夕食 (dinner, uttered as "yuushoku")" are likely to be used at night, so that it is more effective to use different dictionaries depending on time. In the present embodiment of the portable telephone set 1, prediction candidate retrieval of candidate words is made in the prediction candidate retrieving function unit 15, based on the temporal information from the timepiece unit 30, using the time dependent dictionary, as shown in FIG. 1. In the case of the time dependent dictionary, such a system may be contemplated in which dictionaries are switched through the memory medium 43 for use or dictionaries sent from e.g., a server as data packets are switched for use.

As use examples of the user dependent dictionaries, dictionaries matched to the age, sex, vocation or school years of a user are provided and those dictionaries that are matched to the user are preferentially used. This allows words peculiar to the age, sex, vocation or school years of the user to be input readily. In the present embodiment of the portable telephone set 1, prediction candidate retrieval of candidate words is made in the prediction candidate retrieving function unit 15 from the memory 17, using the user dependent dictionary, as shown in FIG. 1. In the user dependent dictionary, such a system may be contemplated in which dictionaries are switched through the memory medium 43 for use, or dictionaries sent as a data packet from e.g., a server may be switched for use.

If, in the above-described embodiment, there are only a small number of or no candidate words beginning from the reading specified as the retrieving condition, so-called ambiguity retrieval is performed in the present embodiment of the portable telephone set. That is, if, in inputting e.g., the Japanese text, the reading "てけ (uttered as "teke")", for example, is specified as the retrieving condition, there are scarcely any word beginning from "てけ (uttered as "teke")", so that ambiguity retrieval is performed using "て (uttered as "te")" and "け (uttered as "ke")" as the retrieving condition. By this ambiguity retrieval, such a word as "電総研 (name of a laboratory; uttered as "den-so-ken")" may be indicated as a candidate word. In case of inputting English, such a word as [pithecanthropus] may be input by specifying only [p] and [t] or by [p] and [s], as an example.

Taking the case of English inputting, the manner of retrieving correct candidate words by the ambiguity retrieval is explained.

Figure 23:
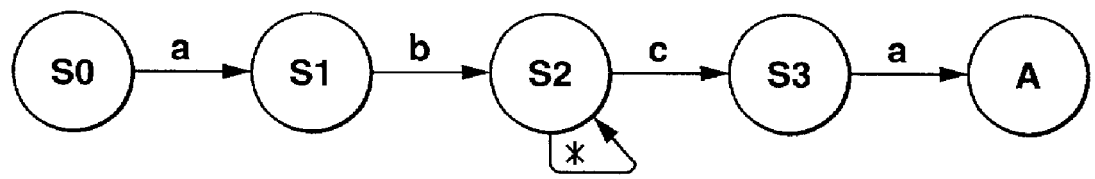
FIG. 23 illustrates the basic structure of status transition machine used for illustrating ambiguity retrieval.

In the present embodiment of the text inputting technique, two sorts of normal expression recognition algorithm are used in combination. For example, in retrieving a character string of [ab ca], a status transition machine for recognizing the pattern of the character string of [ab ca] can be represented as in FIG. 23, where [*] indicates that any input character will do. In the status transition machine, shown in FIG. 23, an initial state S1 transfers to the next state S1 by the input character [a], the state S2 transfers to the next state S3 by the input character [b], the state S3 transfers to the next state S4 by the input character [c] and state S4 transfers to the next state A by the input character [a]. This state A is termed an ultimate state or the reception state and indicates whether or not the character string of [ab ca] has been received. If the input characters [a], [b], [*], [c] or [a] are not afforded, the states S1, S2, S3 or A are extinct.

Figure 24:
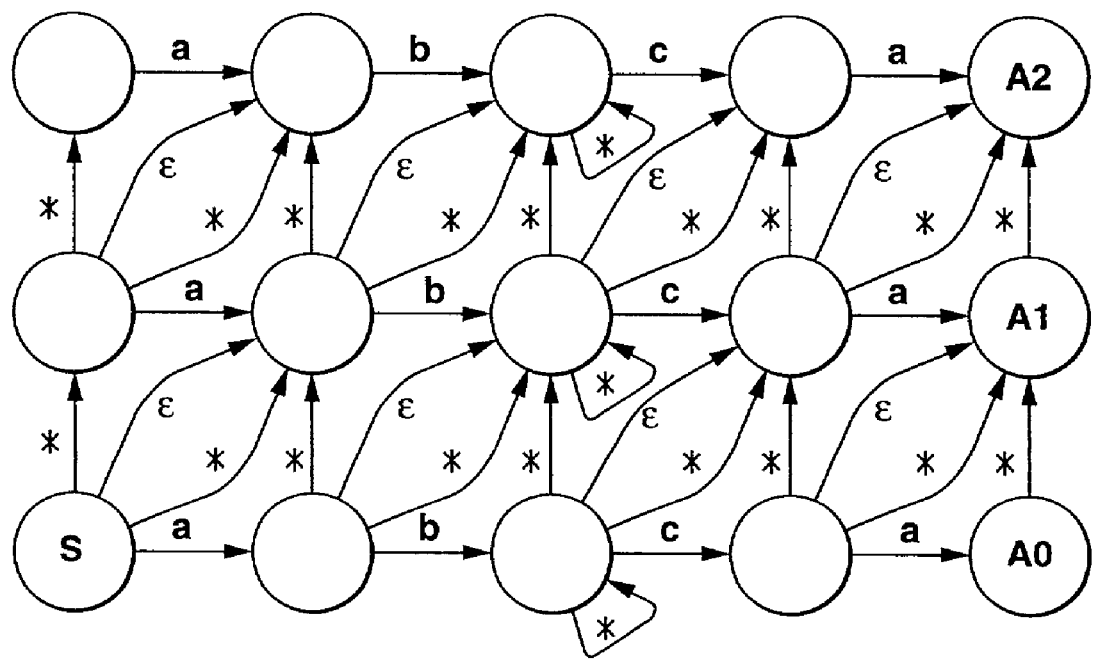
FIG. 24 illustrates the structure extended from the status transition machine used for illustrating ambiguity retrieval.

The status transition machine, represented as in FIG. 24, can be enlarged to a machine permitting mismatching (character in error/character dropout/character inserted erroneously) by increasing the number of states, as shown in FIG. 24. Specifically, the states A0 is the reception state not allowing for mis-match, whilst the states A1 and A2 are states permitting a character in error and not permitting characters in error, respectively.

As the technique for ambiguity retrieval, the technique for effecting pattern matching using e.g., shifting processing is described in a publication by Ricardo A. Baeza-Yates and Gaston H. Gonnet, A new approach to text searching, Communication of the ACM, Vol. 35, No. 10, pp. 74-82, October 1992, or Sun Wu and Udi Manber. Agrep- a fast approximate pattern-matching tool, In Proceedings of USENIX Technical Conference, pp. 153-162, San Francisco, Calif., January 1992. The implementation in hardware is described in a publication (Hachiro Yamada, Kosuke Taakahashi, Masami Hirata, Hajuime Nagai, Character String Retrieval LSI enabling Ambiguity Retrieval, Nikkei Electronics, No. 422, pp. 165-181, Jun. 1, 1987). In addition, the present inventors have disclosed the technique in a thesis extended to Information Processing Association journal, January 1996, pp. 13 to 23. So, detailed explanation is not made herein. In the ambiguity retrieval, it is possible to input several optional characters in the character string in the order in which the characters appear in the character string, instead of inputting its leading end character.

Figure 25:
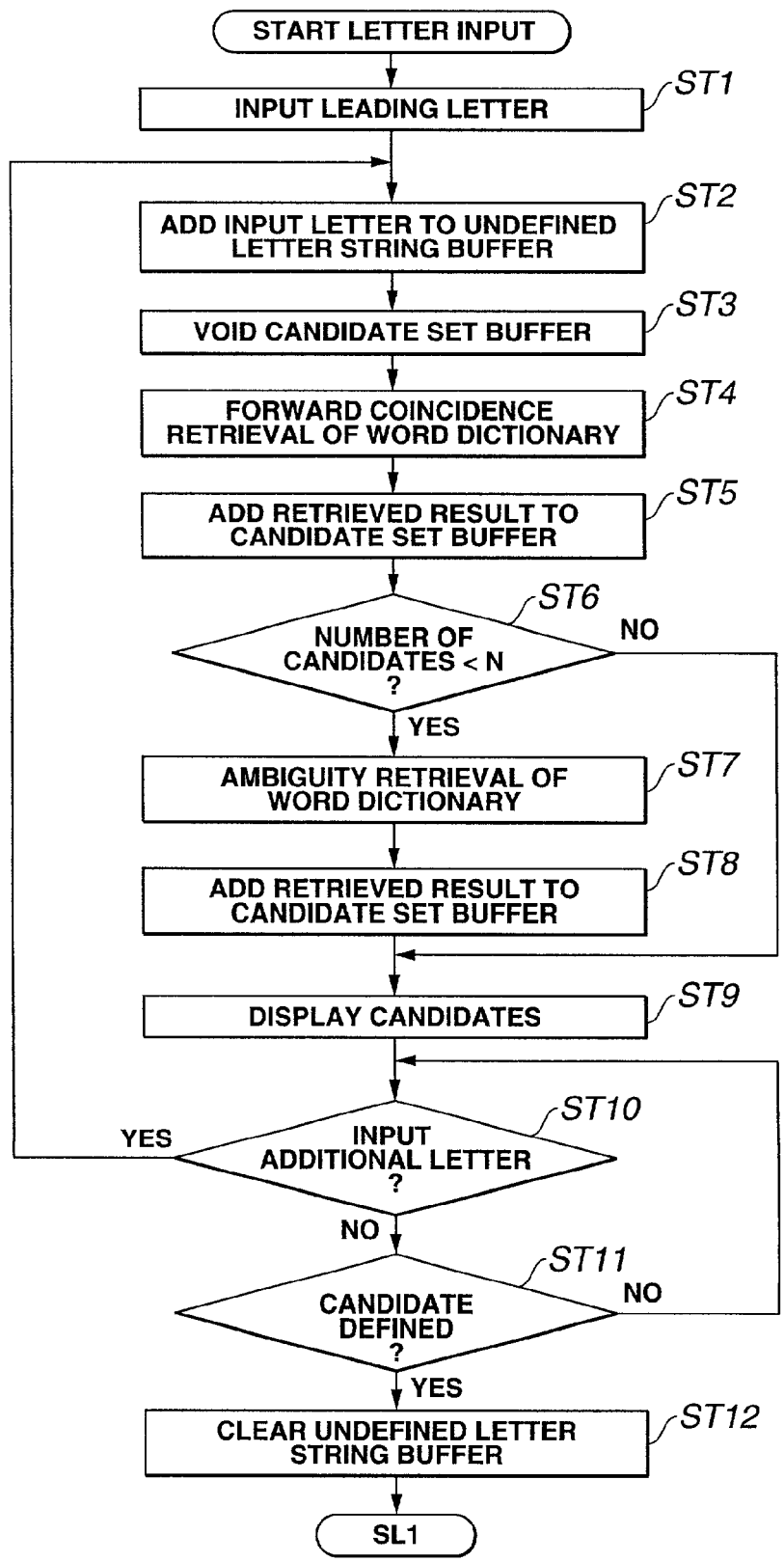
FIG. 25 is a flowchart for illustrating the former half portion of character inputting processing in an embodiment of the present invention.
Figure 26:
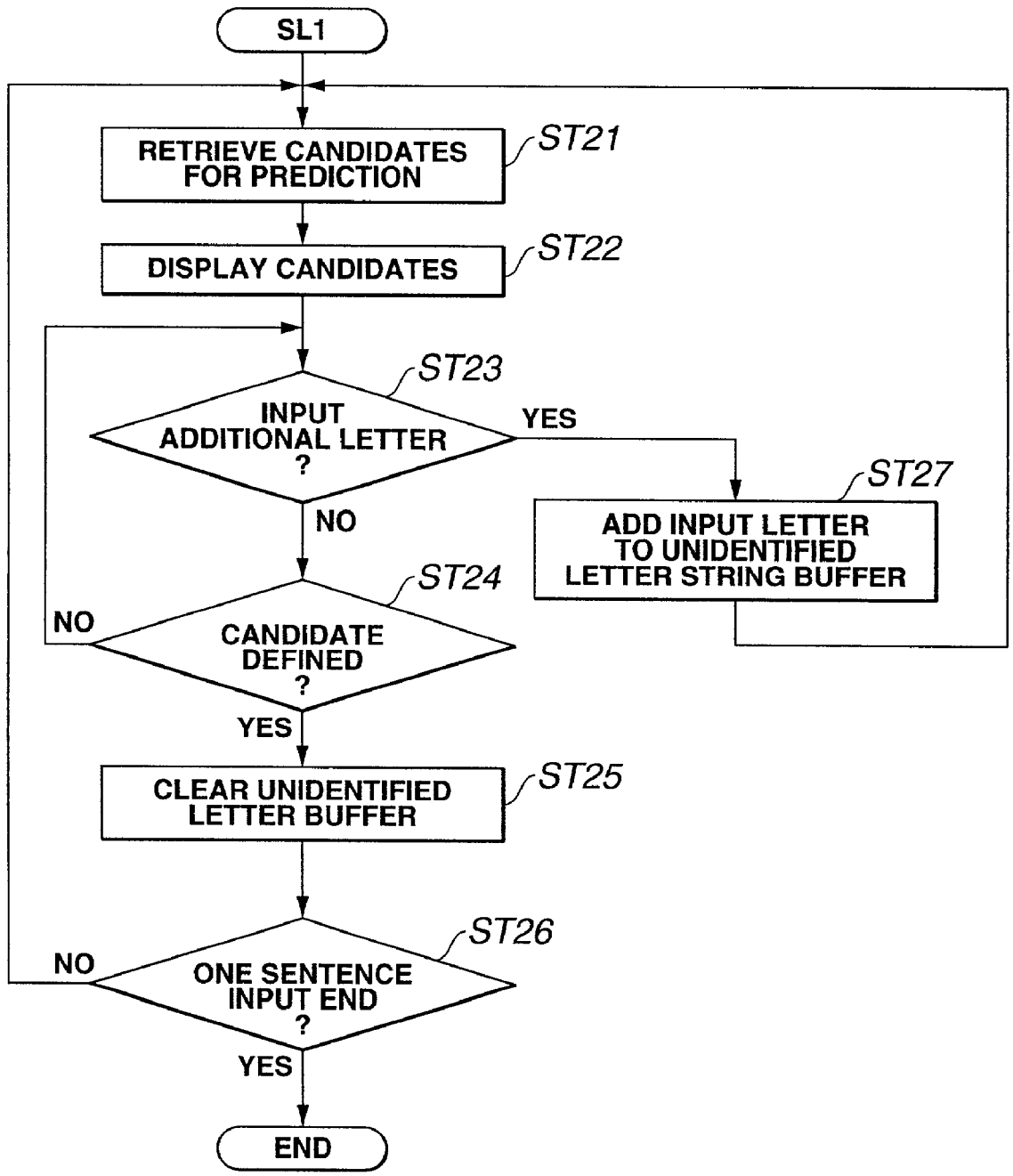
FIG. 26 is a flowchart for illustrating the latter half portion of character inputting processing in an embodiment of the present invention.
Figure 27:
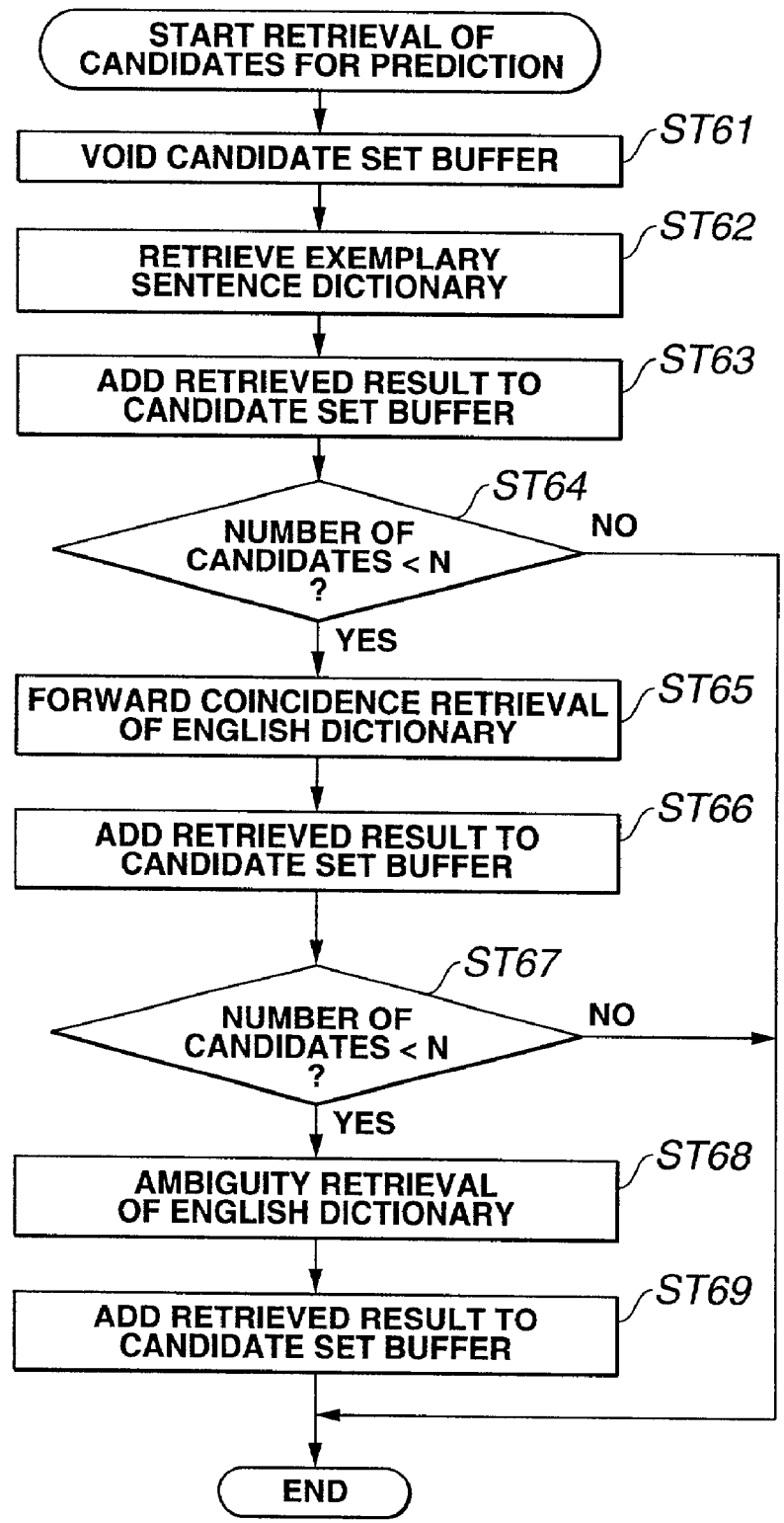
FIG. 27 is a flowchart for illustrating the processing for prediction candidate retrieval.

The processing flow in the structure shown in FIG. 1 for realizing the specified text inputting as described above is now explained using the flowchart of FIGS. 25 to 29. The processing of this flowchart is realized by the CPU 13 having the functions of the learning functional unit 14, prediction candidate retrieving function unit 15 and the kana-kanji converting function unit 16 controlling the various portions and performing data processing. The functions of the various function units 14 to 16 may also be stored in the memory 17 as the application program to actuate the CPU 13 based on this application program. Meanwhile, FIGS. 25 and 26 show the entire flow of the character inputting processing in the portable telephone set 1 having the structure as shown in FIG. 1. Although FIGS. 25, 26 represent one drawing, these are shown separately for convenience in drawing. FIG. 27 shows specified flow in prediction candidate retrieval processing in the flowchart of the character inputting processing.

At step ST1 in FIG. 25, the reading of the leading character of a character string desired to be input as the aforementioned retrieving condition is input. That is, the reading of the leading character for specifying the retrieving condition by the ten-keys as described above is input.

When the leading character has been input, the CPU 13 at step ST2 stores data of the input character in a buffer provided in the memory 17 of FIG. 1, while clearing at step ST3 a buffer for storing the set of candidate words, provided in the memory 17, referred to below as a candidate set buffer. Meanwhile, the buffer for storing the input character buffer is a buffer in which to store the character string specified as the retrieving condition. Since the retrieving condition is made up of a character string, comprised of two or more characters, instead being made up of a sole character, and hence is not finalized until the candidate words are selected. Thus, in the present embodiment, the buffer in which to store the character string specified as the retrieving condition is referred to as an unfinalized character string buffer.

At step ST4, the CPU 13 retrieves a candidate word having the character or character string to be stored in the unfinalized character string buffer, as the leading end character, from the aforementioned word dictionary. Meanwhile, this retrieval with the use as a keyword of a leading end character or character string is referred to as forward coincidence retrieval. The CPU 13 at step ST5 stores the candidate words obtained by the forward coincidence retrieval of the word dictionary at step ST4 in the candidate set buffer.

The CPU 13 at step ST6 verifies whether or not the number of candidate words, retrieved as described above, is smaller than a pre-set number N. This number N corresponds to the number of the candidate words that can be displayed in the candidate display area 26b, as mentioned previously. If the result of the above check is NO, that is if the number of the candidate words is not less than the pre-set number N, the CPU 13 proceeds to the processing of step ST9, as later explained. If conversely the result of the above check is YES, that is if the number of the candidate words is less than the above number N, the CPU 13 proceeds to the processing of step ST7.

At step ST7, since the number of the candidate words retrieved is as yet smaller than the number N that can be displayed in the candidate display area 26b, further candidate words are retrieved from the word dictionary. The retrieval at this time is the aforementioned ambiguity retrieval. The number of candidate words retrieved by this ambiguity retrieval can be made equal to the number that can be displayed in the candidate display area 26b when the number of the retrieved candidate words is summed to the previously retrieved candidate words. After the ambiguity retrieval at step ST7, the CPU 13 adds the retrieved result obtained (the set of the candidate words) to the candidate set buffer, and reads out at step ST9 the set of the candidate words stored in the candidate set buffer for display in the candidate display area 26b.

The CPU 13 also verifies at this time at step ST10 whether or not an additional character has been input, that is whether or not the sole character (reading) to be added newly as the retrieving condition by the actuation of the ten key has been input. If the result of check is YES, that is if an additional character has been input at step ST19, the CPU 13 reverts to the processing at step ST2 to add the added character to the character or character string, stored previously in the unfinalized character string buffer, for storage therein. The CPU 13 then performs the processing from step ST3 to ST10 as described above. The same applies for a case wherein an additional character has further been added at step ST10.

When it is verified that no additional character has been input at step ST10, the CPU 13 verifies whether or not the candidate word has been finalized by the rotation of the jog dial 40 or the pressing of the character finalizing key 47, that is whether or not the candidate word has been selected from the candidate words displayed on the candidate display area 26*b*. If the result of check at this step ST11 is NO, that is if the candidate word has not been finalized, the CPU reverts to the processing at step ST10. If the result of check at this step ST11 is YES, that is if the candidate word has been finalized, the prediction candidate retrieval is carried out for predicting the candidate word that should come next to the finalized word (for example, the candidate word having the highest occurrence probability as mentioned previously), based on the already finalized word (character string). If the set of the candidate words is obtained by the aforementioned prediction candidate retrieval, the CPU 13 displays the set of the candidate words in the candidate display area 26*b*, by way of performing the next step ST22.

Since the candidate word has now been finalized, the CPU 13 has to transfer to the processing for inputting the next character. To this end, the CPU 13 clears the undefined character string buffer, before proceeding to the processing as from the step ST21 of FIG. 26. Since the inputting of at least one word has been finalized by the processing by the flowchart of FIG. 25, the processing of step ST21 of FIG. 26 is the processing of predictive candidate retrieval of predicting the candidate word which should come next to the finalized word, such as the candidate word having the highest occurrence frequency, based on the already finalized word (character string). If the set of the candidate words is obtained by the prediction candidate retrieval, the CPU 13 displays the set of these candidate words in the candidate display area 26*b* at the next step ST22.

The CPU 13 at step ST23 checks whether or not an additional character has been input, that is whether or not the one character newly added as a retrieving condition by the ten-key actuation has been made.

If the result of check at this step ST11 is YES, that is if, at this step ST23, the additional character has been input, the newly added character is added to the character or character string stored in the unfinalized character string buffer for storage therein. The processing from step ST21 to step ST23 then is carried out as before, with the character string stored in the unfinalized character string buffer as the retrieving condition. The same applied for a case wherein further additional inputs are made at step ST23.

If it is verified at step ST23 that no addition character has been input, the CPU 13 proceeds to decide whether or not the candidate word has been finalized at step ST24, that is whether or not, by the rotation of the jog dial 40 or the thrusting of the character finalizing key 47, the desired candidate word has been selected from the set of candidate words displayed in the candidate display area 26*b*. If the result of decision at step ST24 is NO, that is if no candidate word has been finalized, the CPU 13 reverts to the processing at step ST23. If the result of decision at step ST24 is NO, that is if the candidate word has been finalized, the CPU 13 proceeds to processing at step ST25.

When the CPU 13 has cleared the unfinalized character string buffer at the above step ST25, it proceeds to step ST26. At this step ST26, the CPU 12 decides whether or not one text has been input. If the result of check at this step ST26 is NO, that is if it is found at step ST26 that the inputting has not come to a close, the CPU repeats the processing from step ST21 to step ST26. If the result of check at this step ST26 is YES, that is if it is found at step ST26 that the inputting has come to a close, the CPU 13 finishes the character inputting processing.

The flow of prediction candidate retrieval processing at step ST21 of the flowchart of FIG. 26 is now explained with reference to the flowchart of FIG. 27.

In FIG. 27, the CPU 13 first clears the candidate set buffer at step ST61 and then proceeds to retrieving the exemplary text dictionary (situation-dependent dictionary) at step ST62. After making the retrieval of the exemplary text dictionary, the candidate word, obtained by the retrieval, is stored in the candidate set buffer (if candidate words are already stored in the candidate set buffer, the new candidate word is added to the stored set of the candidate words.

At this time, the CPU 13 at step ST64 verifies whether or not the number of the retrieved candidate words is smaller than the pre-set number N. If the number of the candidate words is found at step ST64 that the number of the candidate words is not less than the number N, the CPU 13 finishes the prediction candidate retrieval processing. If the number of the candidate words is found at step ST64 that the number of the candidate words is less than the number N, the CPU 13 proceeds to the processing of step ST65.

When at the processing at step ST65, the CPU 13 performs the aforementioned forward coincidence retrieval and, at the next step ST66, stores the candidate words obtained by this retrieval in the candidate set buffer.

The CPU 13 at step ST67 re-verifies whether or not the number of the retrieved candidate words is smaller than the pre-set number N. If the number of the candidate words is found at step ST67 that the number of the candidate words is not less than the number N, the CPU 13 finishes the prediction candidate retrieval processing. If the number of the candidate words is found at step ST67 that the number of the candidate words is less than the number N, the CPU 13 proceeds to the processing of step ST68.

When at the processing at step ST65, the CPU 13 performs the aforementioned ambiguity retrieval and, at the next step ST69, stores the candidate word resulting from the retrieval in the candidate set buffer to terminate the prediction candidate retrieval processing.

Although the above-described embodiment is directed to preparation of, for example, an E-mail by the present embodiment of the portable telephone set 1, the prediction candidate retrieval processing of the present embodiment may also be usable for retrieval of a telephone directory registered in an address book storage area 19 in the internal memory 17 or retrieval of schedule data written in a schedule memo storage area 18.

Referring to FIGS. 28 to 32, the operation in making prediction candidate retrieval of the telephone directory is explained.

Figure 28:
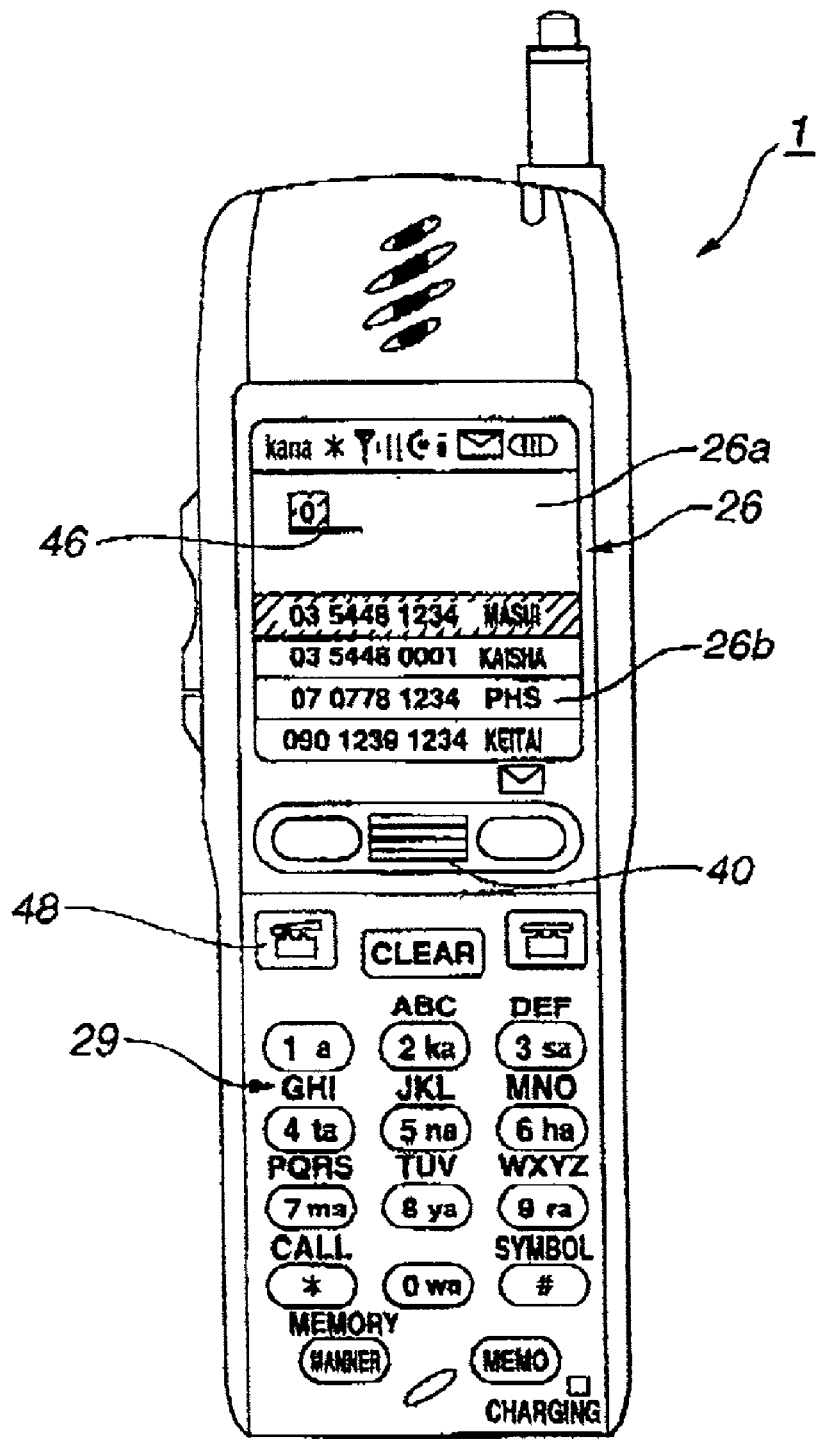
FIG. 28 illustrates a case wherein, in retrieving prediction candidates for telephone numbers in the portable telephone set embodying the present invention, the retrieving condition for [0] is input to the input displaying area and the portable telephone number in meeting with the retrieving condition for [0] is displayed in the candidate display area.

When making a call using the present embodiment of the portable telephone set 1, desired ten-keys are pushed in e.g., a reception ready state to enter corresponding numerals. For example, if a key [0] is input, a set of plural candidate telephone numbers, beginning with [0], and the names of callees, is displayed, with the number [0] as the retrieving condition. FIG. 28 shows e.g. four cases of respective candidate telephone numbers, as the plural candidate telephone numbers, beginning with [0], displayed in the candidate display area 26*b*, in the order of the decreasing occurrence frequency, such as [0354481234 増井 (name of a person; uttered as "Masui")], [0355448001 会社(company; uttered as "kaisha")] or

[07077071234 PHS]. Meanwhile, .the candidate telephone numbers, displayed in the candidate display area 26b, represent a portion of plural candidate telephone numbers corresponding to [0] as the retrieving condition.

Those candidate telephone numbers displayed on the candidate display area 26b of FIG. 28 but shown highlighted indicate that these candidate telephone numbers are candidates of finalized telephone numbers input as from the cursor 46 position, such that, if a receiving key 48 is pushed in this state, the candidate telephone number, shown highlighted, is finalized.

If, as the candidate telephone number is not finalized, the jog dial 40 is rotated, highlighted display of the candidate telephone number shifts to sequentially next candidate telephone numbers. If the jog dial 40 is thrust to turn the switch unit on (jog push), the set of the candidate telephone numbers displayed on the candidate display area 26b is switched to the next set of the candidate telephone numbers.

By the above process, the desired one of the candidate telephone numbers displayed on the candidate display area 26b may be the finalized telephone number. The case of FIG. 28 shows such a state in which the candidate word is not fixed.

Figure 29:
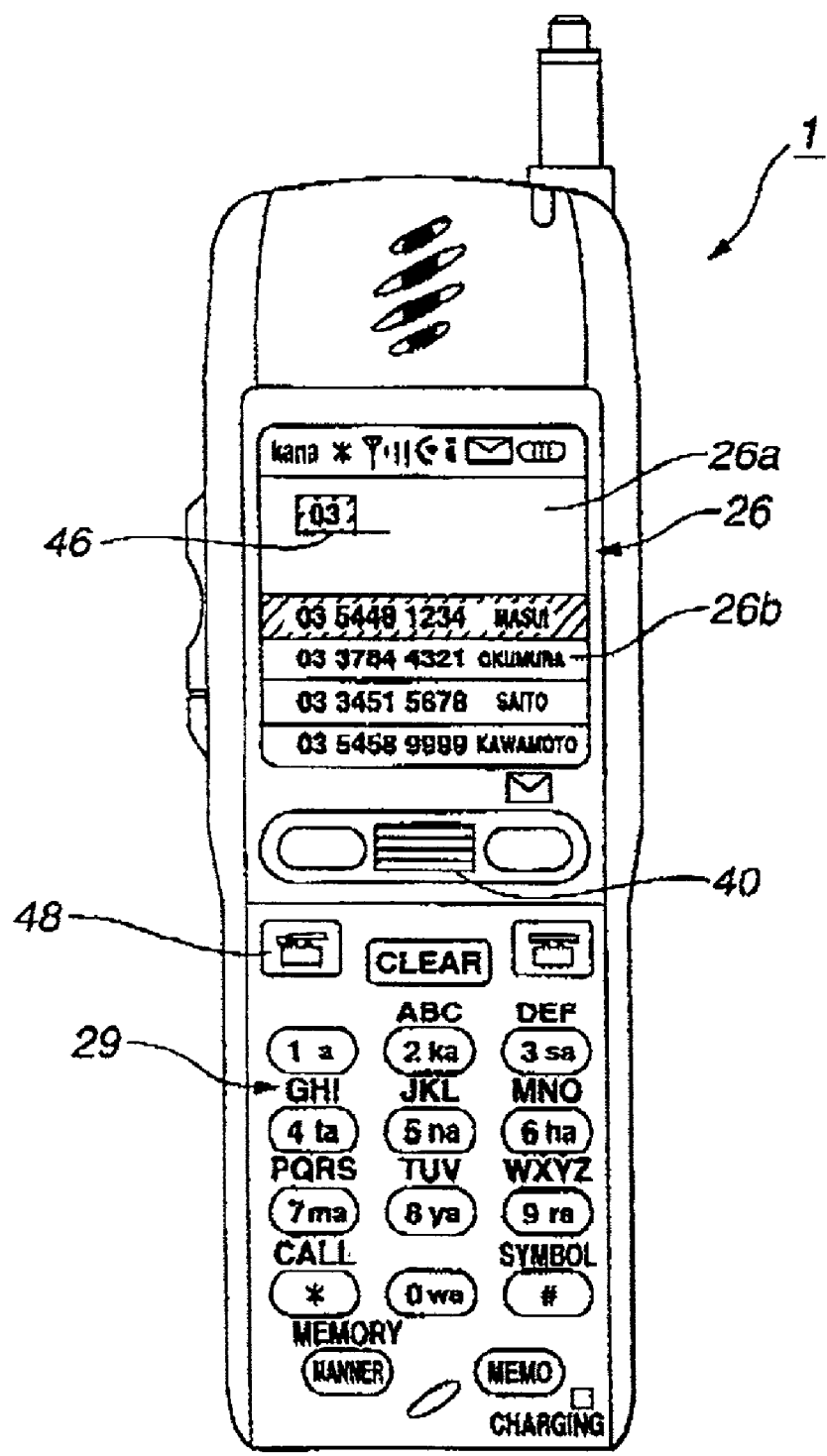
FIG. 29 illustrates a case wherein a retrieving condition for [03] is input to the input display area and candidate telephone numbers corresponding to the retrieving condition for [03] are displayed in the candidate display area.

If a number [0] is displayed on the cursor 46 of the input display area 26a as in FIG. 28, and a key, such as a key for [3], is pushed, as no candidate telephone number has as yet been set, the number [03] is demonstrated on the cursor 46 of the input display area 26a, as shown in FIG. 29. If the number [03] is input, a set of candidate telephone numbers beginning with [03] is displayed in the candidate display area 26b, with the number [03] as the retrieving condition. In FIG. 29, the plural candidate telephone numbers beginning with [03], displayed in the candidate display area 26b, are displayed as the plural telephone numbers beginning with [03] in the order of the decreasing occurrence frequency.

Figure 30:
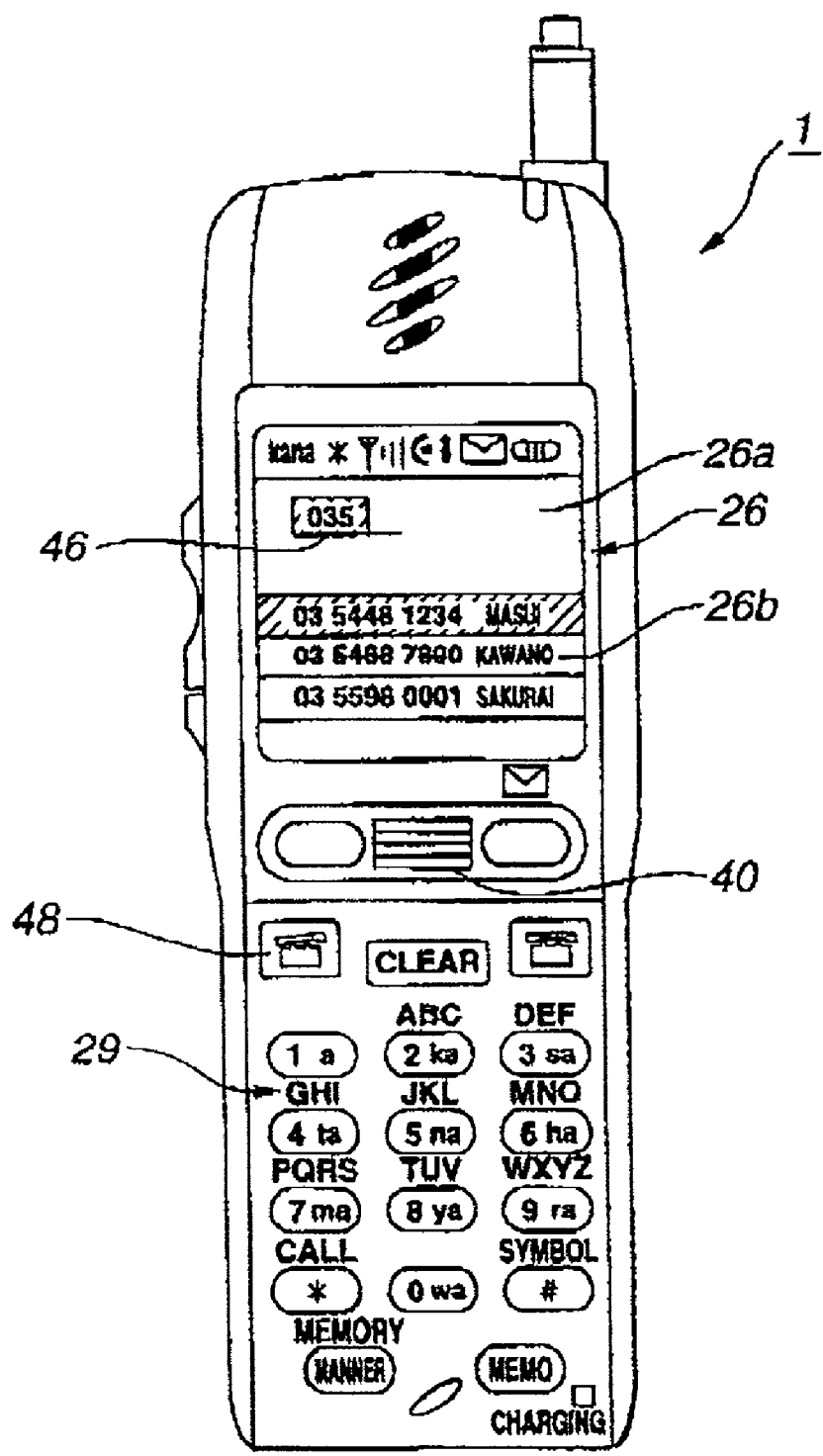
FIG. 30 illustrates a case wherein a retrieving condition for [035] is input to the input display area and candidate telephone numbers corresponding to the retrieving condition for [035] are displayed in the candidate display area.
Figure 31:
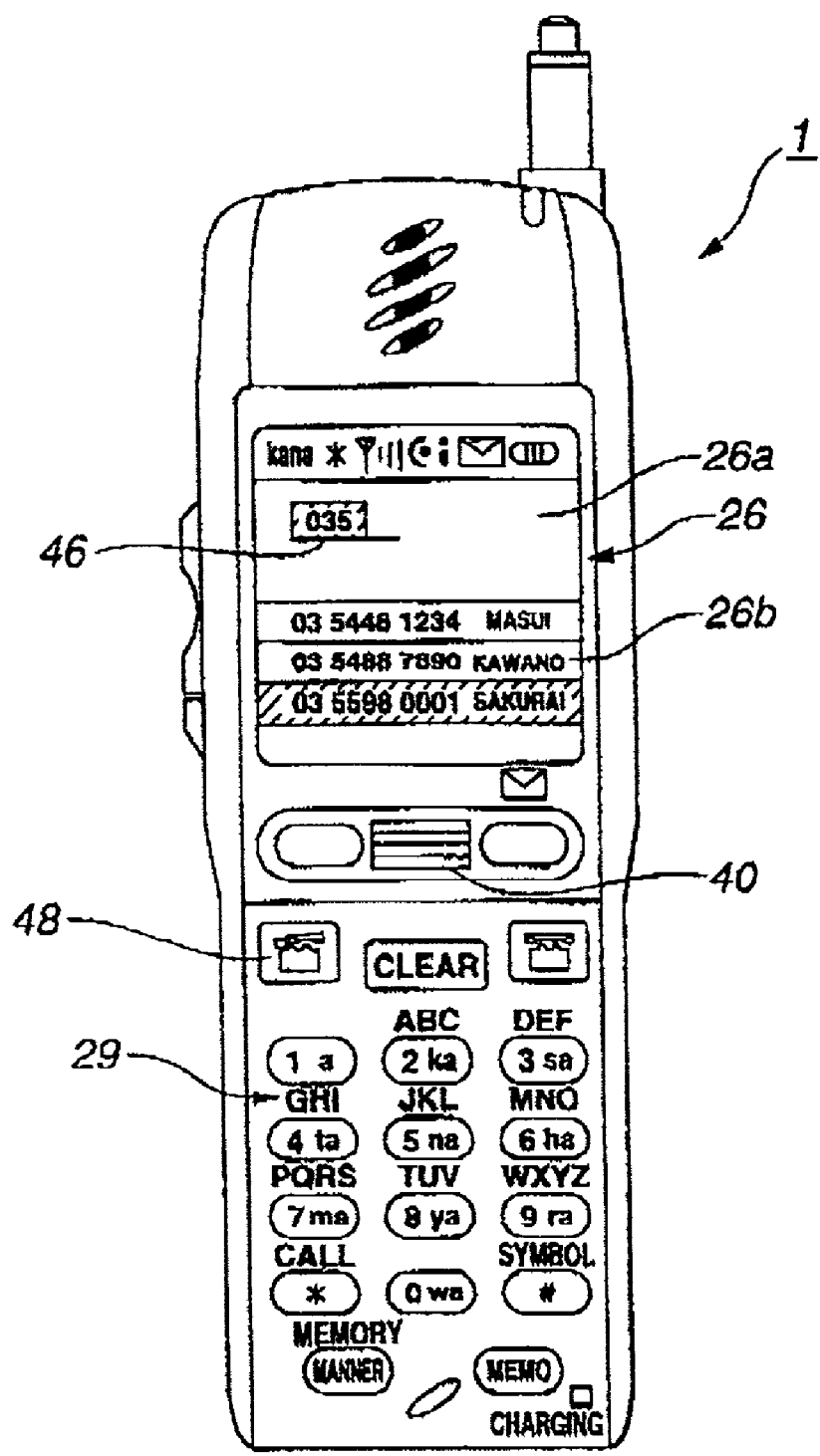
FIG. 31 illustrates how a desired telephone number is selected from the candidate telephone numbers displayed in the candidate display area.
Figure 32:
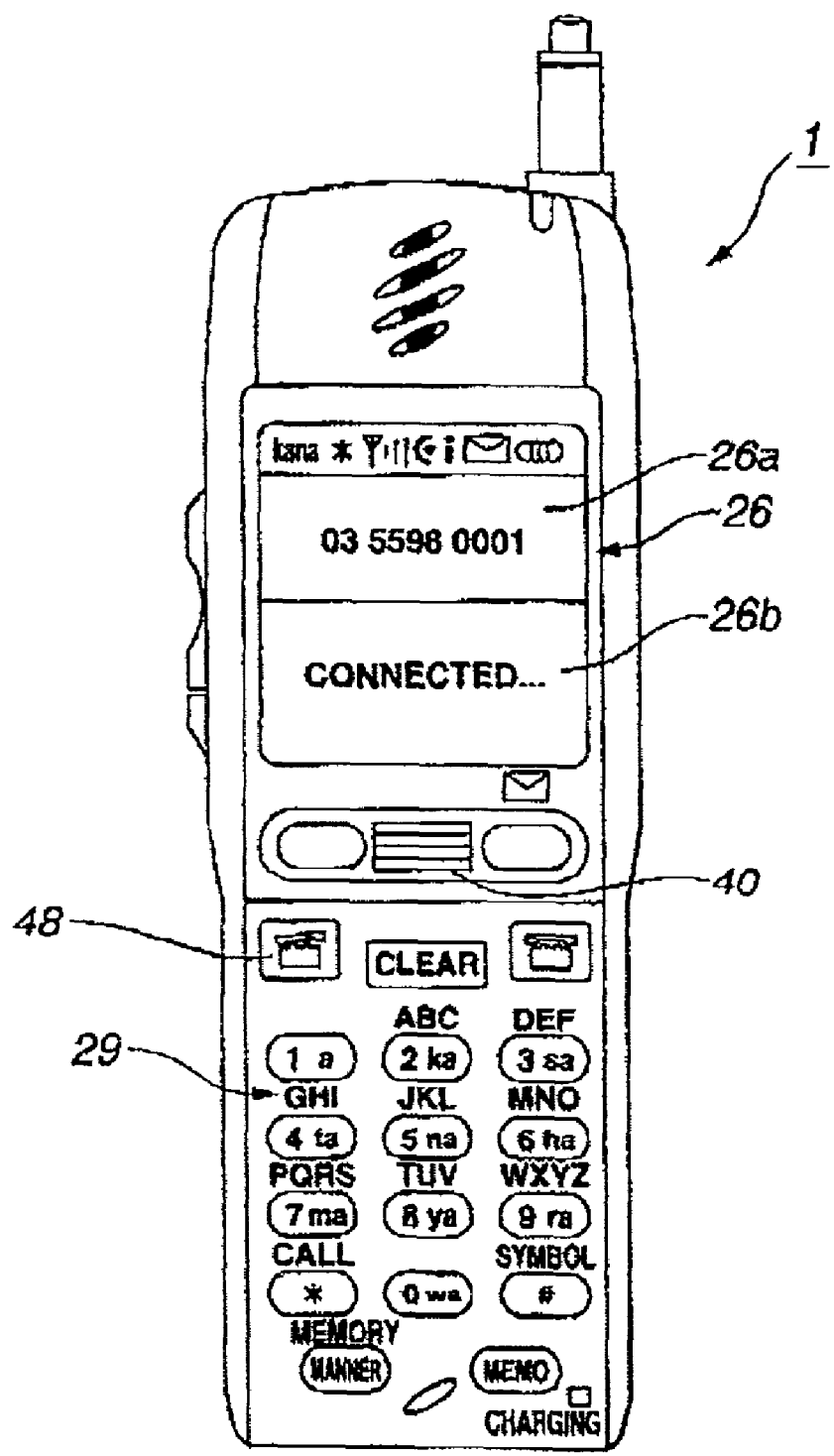
FIG. 32 illustrates the state of connection following selection of the desired telephone number.

If a number [03] is displayed on the cursor 46 of the input display area 26a as in FIG. 29, and a key, such as a key for [5], is pushed, as no candidate telephone number has as yet been set, the number [035] is demonstrated on the cursor 46 of the input display area 26a, as shown in FIG. 30. If the number [035] is input, a set of candidate telephone numbers beginning with [035] is displayed in the candidate display area 26b, with the number [035] as the retrieving condition. In FIG. 30, the plural candidate telephone numbers beginning with [035], displayed in the candidate display area 26b, are displayed as the plural telephone numbers beginning with [035] in the order of the decreasing occurrence frequency.

If now the jog dial 40 is rotated to display one of the candidate telephone numbers, such as [0355980001 桜井 (name of a person; uttered as "Sakurai")] displayed in the candidate display area 26b, in a highlighted state, and the receiving key 48 is thrust in this state, the candidate telephone number [0355980001], shown highlighted, is displayed in the input display area 26 to start the telephone connection. If connection begins in this manner, the display of the candidate telephone numbers on the candidate display area 26b is erased, so that, for example, only [being connected] is displayed.

Although the embodiment described above is such a one in which the numbers of the telephone number are sequentially input from the leading end numeral of the telephone number by way of performing prediction candidate retrieval, the candidate telephone numbers can be retrieved, by applying the aforementioned ambiguity retrieval technique, even when the numerals are input beginning from the trailing end of the telephone number or several numerals are input in a skipping fashion.

Figure 33:
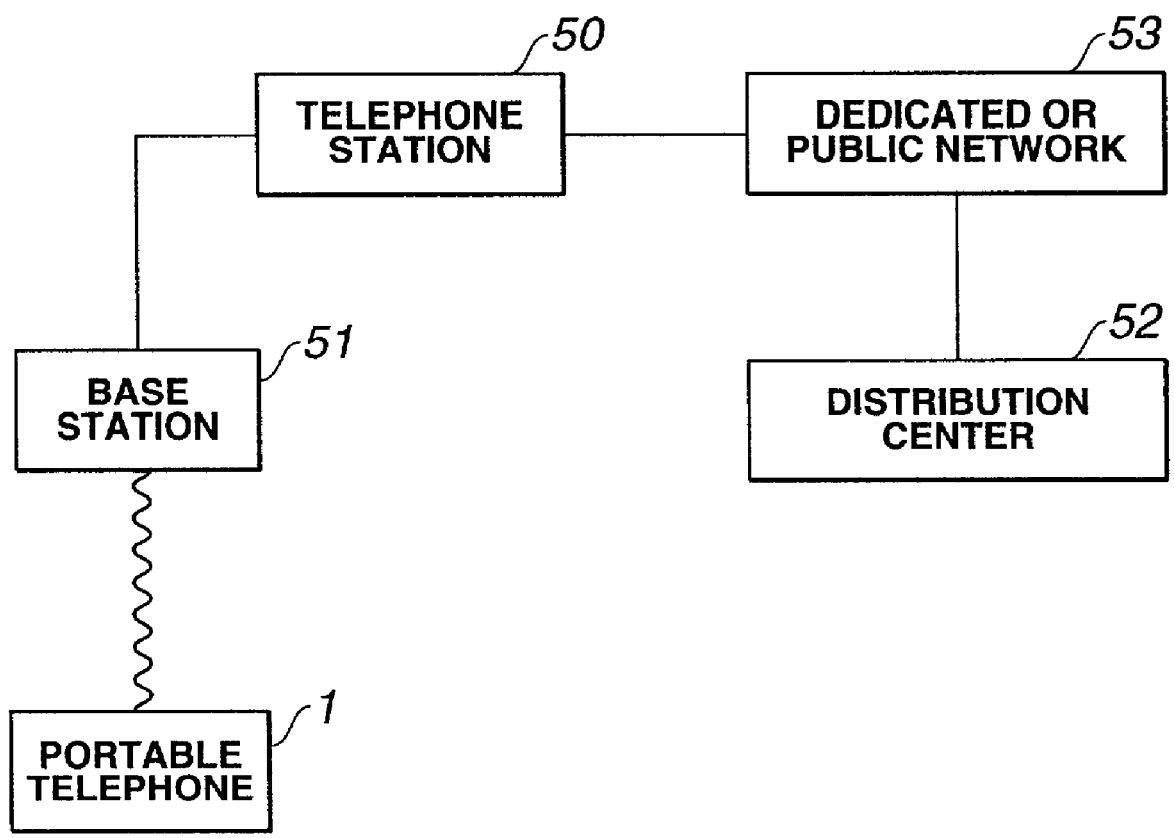
FIG. 33 illustrates an illustrative structure for a case where a situation-dependent dictionary is received from a server of a distribution center by a data packet.

FIG. 33 shows an illustrative structure in case the aforementioned situation-dependent dictionary is received from the server of a distribution center 52 by data packets.

In FIG. 33, the present embodiment of the portable telephone set 1 has a call or transmits/receives data packet with a base station 51, which is connected to a telephone station 50.

The telephone station 50 is connected over a dedicated or public network 53 to a distribution center 52.

The distribution center 52 includes a server for saving and distributing the aforementioned situation-dependent dictionary and distributes a situation-dependent dictionary adapted to plural situations.

Thus, with the present embodiment of the portable telephone set 1, not only the change of the situation-dependent dictionary, employing the aforementioned memory medium 43, but also conversion of predictive candidates adapted to plural sorts of situations, becomes feasible.

Although the description of FIG. 33 is directed to a case of distributing only situation-dependent dictionary data from the distribution center 52, not only the situation-dependent dictionary data but also no other than the aforementioned application program for realizing the information inputting method or the dictionary retrieving method may be distributed.

With the above-described embodiment of the present invention, the load of inputting plural characters and a variety of information in an electronic equipment having a restricted number of available keys may be relieved.

In the present embodiment, the portable telephone set 1 is taken as an example. The present invention is, however, applicable to electronic equipment of all sorts of portable terminals in which limitations are imposed on the number of keys.

Recently, it has been contemplated to connect the portable terminals to pre-set communication network in a set top box comprised of an IRD (integrated receiver decoder) receiving the digital satellite broadcasting or a domestic game machine to enable E-mail transmission/reception or connection to the Internet. However, limitations are imposed on the number of keys of an accessory remote controller (remote commander) such that the creation of the text of e.g., an E-mail with the remote commander is extremely complex as compared to that with the use of a routine full keyboard. Thus, if the present invention is applied to a set top box or the domestic game machine, and a remote controller thereof, text creation is facilitated significantly.

When the present invention is applied to the set top box, or the domestic game machine and a remote controller thereof, the jog dial can be provided on the side remote controller, while sockets for the standard dictionary, situation-dependent dictionary, kana-kanji conversion unit, learning function unit or the memory medium may be provided on the side set top box or on the side domestic game machine. The situation-dependent dictionary can be downloaded through the pre-set communication circuit from the distribution center.

In employing the present embodiment, the above-mentioned input display area and the candidate display area are demonstrated on a set top box or a monitor connected to the domestic game machine, and a retrieving condition is input by key operations from a remote controller to select and finalize candidate words in the candidate display area. Since the display area of the monitor in the present embodiment is much larger than the LCD of the portable telephone set, more information than is possible in the aforementioned embodiment can be demonstrated in the input display area and in the candidate display area, thus assuring facilitated text creation.

As in the network configuration, shown in FIG. 33, it is possible in the present embodiment to distribute no other than the application program for the realization of the situation-dependent dictionary, standard dictionary, information inputting method and the dictionary retrieving method according to the present invention can be distributed from a server of a distribution center to a set top box or to a domestic game machine.

What is claimed is:

1. A portable terminal comprising:
    display means;
    dictionary storage means for storing a first dictionary and a second dictionary, the first dictionary including words which have a high frequency of use during a first time period, and the second dictionary including words which have a high frequency of use during a second time period;
    inputting means for inputting one or more characters;
    providing means for providing the one of the first dictionary or the second dictionary which contains words used with a higher frequency of use for a time of character input, wherein the first dictionary contains words having the higher frequency of use for the time of character input when the time of character input is within the first time period and the second dictionary contains words having the higher frequency of use for the time period when the time of character input is within the second time period;
    retrieval means for retrieving words from the provided dictionary for display on the display means, from the dictionary storage means, based on the one or more characters;
    selecting means for selecting one or more of the displayed words; and
    character string generating means for generating information on a finalized character string from the one or more selected words.

2. The portable terminal according to claim 1 wherein said dictionary storage means is capable of updating and/or adding dictionary information to the first dictionary or the second dictionary.

3. The portable terminal according to claim 2 further comprising:
    dictionary information acquisition means for acquiring said dictionary information through a storage medium.

4. The portable terminal according to claim 1 wherein said retrieval means retrieves from said dictionary storage means a plurality of words having one or more of the characters from said inputting means as a leading end character.

5. The portable terminal according to claim 4 wherein said retrieval means retrieves the words having one of the characters from said inputting means as a leading end character sequentially beginning from a word having a highest occurrence frequency.

6. The portable terminal according to claim 4 wherein said retrieval means retrieves the words having one of the characters input from said inputting means as a leading end character sequentially beginning from a word selected in the past nearest to the current time.

7. The portable terminal according to claim 1 wherein said retrieval means retrieves from said dictionary storage means plural words including a plurality of the characters input from said inputting means.

8. The portable terminal according to claim 7 wherein said retrieval means retrieves a plurality of words each including a plurality of the characters input from said inputting means as constituent elements in the inputting sequence.

9. The portable terminal according to claim 7 wherein said retrieval means retrieves the words each including a plurality of the characters input from said inputting means as constituent elements sequentially beginning from a word with a highest occurrence frequency.

10. The portable terminal according to claim 7 wherein said retrieval means retrieves the words each including a plurality of the characters input from said inputting means as constituent elements sequentially beginning from a word selected in the past nearest to the current time.

11. The portable terminal according to claim 1 wherein said retrieval means predicts and retrieves a plurality of words appearing next to a character string that has already been finalized.

12. The portable terminal according to claim 11 wherein said retrieval means predicts and retrieves a plurality of words appearing next to a character string that has already been finalized, beginning from a word having a highest occurrence frequency.

13. The portable terminal according to claim 11 wherein said retrieval means predicts and retrieves a plurality of words appearing next to a character string that has already been finalized, beginning from a word selected in the past nearest to the current time.

14. The portable terminal according to claim 1, further comprising a downloading means for downloading the first dictionary and the second dictionary.

15. A computer-implemented method for a portable terminal comprising:
    storing a first dictionary and a second dictionary, the first dictionary including words which have a high frequency of use during a first time period, and the second dictionary including words which have a high frequency of use during a second time period;
    inputting one or more characters;
    providing the one of the first dictionary or the second dictionary which contains words used with a higher frequency of use for a time of character input, wherein the first dictionary contains words having the higher frequency of use for the time of character input when the time of character input is within the first time period and the second dictionary contains words having the higher frequency of use for the time period when the time of character input is within the second time period;
    retrieving words from the provided dictionary for display, based on the one or more characters;
    displaying one or more of the retrieved words;
    selecting one or more of the displayed words; and
    generating information on a finalized character string from the one or more selected words.

16. The computer-implemented method for a portable terminal according to claim 15, further comprising updating and/or adding dictionary information to the first dictionary or the second dictionary.

17. The computer-implemented method for a portable terminal according to claim 16 further comprising:
    acquiring said dictionary information through a recording medium.

18. The computer-implemented method for a portable terminal according to claim 15, further comprising retrieving a plurality of words having one of the characters as a leading end character from the first dictionary or the second dictionary.

19. The computer-implemented method for a portable terminal according to claim 18, further comprising retrieving words having one of the characters as a leading end character sequentially beginning from a word having a highest occurrence frequency.

20. The computer-implemented method for a portable terminal according to claim 18, further comprising retrieving words having one of the characters as a leading end character sequentially beginning from a word selected in the past nearest to the current time.

21. The computer-implemented method for a portable terminal according to claim 15, further comprising retrieving from the first dictionary or the second dictionary words including a plurality of the characters.

22. The computer-implemented method for a portable terminal according to claim 21 wherein said retrieval step retrieves a plurality of words each including a plurality of the characters as constituent elements in the inputting sequence.

23. The computer-implemented method for a portable terminal according to claim 21, further comprising retrieving the words each including a plurality of the characters as constituent elements sequentially beginning from a word with a highest occurrence frequency.

24. The computer-implemented method for a portable terminal according to claim 21, further comprising retrieving the words each including a plurality of the characters as constituent elements sequentially beginning from a word most recently selected word.

25. The computer-implemented method for a portable terminal according to claim 15, further comprising predicting a plurality of words appearing next to a character string that has already been finalized.

26. The computer-implemented method for a portable terminal according to claim 25, further comprising predicting a plurality of words appearing next to a character string that has already been finalized, beginning from a word having a highest occurrence frequency.

27. The computer-implemented method for a portable terminal according to claim 25, further comprising predicting a plurality of words appearing next to a character string that has already been finalized, beginning from a word selected in the past nearest to the current time.

28. The computer-implemented method according to claim 15, further comprising downloading the first dictionary and the second dictionary.

29. A computer readable medium storing a computer program for causing a portable terminal to execute an information inputting method, the information inputting method comprising:

storing a first dictionary and a second dictionary, the first dictionary including words which have a high frequency of use during a first time period, and the second dictionary including words which have a high frequency of use during a second time period;

inputting one or more characters;

providing the one of the first dictionary or the second dictionary which contains words used with a higher frequency of use for a time of character input, wherein the first dictionary contains words having the higher frequency of use for the time of character input when a time of character input is within the first time period and the second dictionary contains words having the higher frequency of use for the time period when the time of character input is within the second time period;

retrieving words from the provided for display from one of the the first dictionary or the second dictionary, based on the one or more characters;

displaying one or more of the retrieved words;

selecting one or more of the displayed words; and generating information on a finalized character string from the one or more selected words.

30. The computer readable medium according to claim 29, wherein the information inputting method further comprises downloading the first dictionary and the second dictionary.

* * * * *